United States Patent
Silberschatz et al.

(10) Patent No.: US 9,263,985 B2
(45) Date of Patent: Feb. 16, 2016

(54) ROOFTOP PHOTOVOLTAIC MODULES

(71) Applicant: PI Solar Technology GmbH, Berlin (DE)

(72) Inventors: Paul Joseph Silberschatz, San Francisco, CA (US); Jerrod Quinton Rodowca, Tucson, AZ (US)

(73) Assignee: PI SOLAR TECHNOLOGY GMBH, Berlin (DE)

( * ) Notice: Subject to any disclaimer, the term of this patent is extended or adjusted under 35 U.S.C. 154(b) by 0 days.

(21) Appl. No.: 14/079,575

(22) Filed: Nov. 13, 2013

(65) Prior Publication Data

US 2014/0130849 A1    May 15, 2014

Related U.S. Application Data

(60) Provisional application No. 61/725,586, filed on Nov. 13, 2012.

(51) Int. Cl.
*E04D 13/18*    (2014.01)
*H02S 20/24*    (2014.01)
*H02S 30/10*    (2014.01)
*F24J 2/46*    (2006.01)
*F24J 2/52*    (2006.01)

(52) U.S. Cl.
CPC ............... *H02S 20/24* (2014.12); *F24J 2/4638* (2013.01); *F24J 2/526* (2013.01); *F24J 2/5233* (2013.01); *F24J 2/5239* (2013.01); *H02S 30/10* (2014.12); *F24J 2002/5279* (2013.01); *Y02B 10/12* (2013.01); *Y02E 10/50* (2013.01)

(58) Field of Classification Search
CPC ......... H02S 20/23; H02S 20/24; Y02E 10/50; Y02B 10/12
See application file for complete search history.

(56) References Cited

U.S. PATENT DOCUMENTS

| | | | |
|---|---|---|---|
| 1,349,908 A | 8/1920 | Post et al. |
| 3,094,303 A | 6/1963 | Belger |
| 3,116,171 A | 12/1963 | Nielsen et al. |
| 3,171,403 A | 3/1965 | Drescher |
| 3,292,306 A | 12/1966 | Carlson |

(Continued)

FOREIGN PATENT DOCUMENTS

| | | |
|---|---|---|
| CN | 102005484 A | 4/2011 |
| DE | 2819901 A1 | 11/1979 |

(Continued)

OTHER PUBLICATIONS

Russell et al. of Ascension Technology, Inc., "PV Array Designs for Flat-Roof Buildings," article, 1993, pp. 1129-1133 (submitted as Exhibit 4 in USDC Case No. 4:08-cv-02807-SBA, Docket No. 39-4 filed Jan. 21, 2009).

(Continued)

*Primary Examiner* — Charles A Fox
*Assistant Examiner* — Patrick Maestri
(74) *Attorney, Agent, or Firm* — Leydig, Voit & Mayer, Ltd.

(57) ABSTRACT

A photovoltaic module may include a first frame portion defining a first plane, a second frame portion defining a second plane angled relative to the first plane, and a photovoltaic panel mounted to the second frame portion. The second frame portion may be supported only at opposing ends. The photovoltaic module may be stackable with similar modules.

34 Claims, 12 Drawing Sheets

(56) References Cited

U.S. PATENT DOCUMENTS

| | | | |
|---|---|---|---|
| 3,411,952 A | 11/1968 | Ross et al. | |
| 3,415,475 A | 12/1968 | Goodman | |
| 3,457,427 A | 7/1969 | Tarneja et al. | |
| 3,565,719 A | 2/1971 | Webb | |
| 3,709,583 A | 1/1973 | Pfannkuch et al. | |
| 3,742,659 A | 7/1973 | Drew | |
| 3,965,954 A * | 6/1976 | Lofredo | 411/213 |
| 3,980,071 A | 9/1976 | Barber, Jr. | |
| 3,988,166 A | 10/1976 | Beam | |
| 3,990,762 A | 11/1976 | Lemesle | |
| 4,004,574 A | 1/1977 | Barr | |
| 4,015,366 A | 4/1977 | Hall, III | |
| 4,019,924 A | 4/1977 | Kurth | |
| 4,025,786 A | 5/1977 | Hamilton | |
| 4,031,385 A | 6/1977 | Zerlaut et al. | |
| 4,040,867 A | 8/1977 | Forestieri et al. | |
| 4,045,934 A | 9/1977 | Sheahan et al. | |
| 4,063,963 A | 12/1977 | Bond, Jr. | |
| 4,074,705 A | 2/1978 | Robinson, Jr. et al. | |
| 4,083,360 A | 4/1978 | Courvoisier et al. | |
| 4,086,599 A | 4/1978 | VanderLinden, Jr. et al. | |
| 4,108,154 A | 8/1978 | Nelson | |
| 4,132,570 A | 1/1979 | Caruso et al. | |
| 4,137,097 A | 1/1979 | Kelly | |
| 4,137,897 A | 2/1979 | Moore | |
| 4,147,154 A | 4/1979 | Lewandowski | |
| 4,148,297 A | 4/1979 | Sherman, Jr. | |
| 4,148,298 A | 4/1979 | Sherman, Jr. | |
| 4,148,299 A | 4/1979 | Sherman, Jr. | |
| 4,154,221 A | 5/1979 | Nelson | |
| 4,165,853 A | 8/1979 | Brandt | |
| 4,191,794 A | 3/1980 | Shirland et al. | |
| 4,204,523 A | 5/1980 | Rothe | |
| 4,217,887 A | 8/1980 | Hoffman et al. | |
| 4,223,214 A | 9/1980 | Dorian et al. | |
| 4,225,781 A | 9/1980 | Hammons | |
| 4,226,256 A | 10/1980 | Hawley | |
| 4,237,863 A | 12/1980 | Harrison | |
| 4,238,912 A | 12/1980 | MacDonald | |
| 4,241,727 A | 12/1980 | Toti | |
| 4,245,895 A | 1/1981 | Wildenrotter | |
| 4,250,606 A | 2/1981 | Korenaga | |
| 4,261,613 A | 4/1981 | Alford | |
| 4,265,221 A | 5/1981 | Whinnery | |
| 4,265,422 A | 5/1981 | Van Leeuwen | |
| 4,266,530 A | 5/1981 | Steadman | |
| 4,269,173 A | 5/1981 | Krueger et al. | |
| 4,271,103 A | 6/1981 | McAlister | |
| 4,291,000 A | 9/1981 | Swales et al. | |
| 4,295,621 A | 10/1981 | Siryj | |
| 4,309,857 A | 1/1982 | Lovering | |
| 4,326,843 A | 4/1982 | Smith | |
| 4,336,413 A | 6/1982 | Tourneux | |
| 4,344,479 A | 8/1982 | Bailey | |
| 4,345,587 A | 8/1982 | Carvalho | |
| RE31,023 E | 9/1982 | Hall, III | |
| 4,371,139 A | 2/1983 | Clark | |
| 4,389,826 A | 6/1983 | Kelly | |
| RE31,321 E | 7/1983 | Harrison | |
| 4,392,009 A | 7/1983 | Napoli | |
| 4,416,618 A | 11/1983 | Smith | |
| 4,421,943 A | 12/1983 | Withjack | |
| 4,429,178 A | 1/1984 | Prideaux et al. | |
| 4,429,952 A | 2/1984 | Dominguez | |
| 4,476,853 A | 10/1984 | Arbogast | |
| 4,502,467 A | 3/1985 | Smith | |
| 4,527,544 A | 7/1985 | Wolf et al. | |
| 4,611,090 A | 9/1986 | Catella et al. | |
| 4,620,397 A | 11/1986 | Simpson et al. | |
| 4,620,771 A | 11/1986 | Dominguez | |
| 4,636,577 A | 1/1987 | Peterpaul | |
| 4,649,675 A | 3/1987 | Moldovan et al. | |
| 4,677,248 A | 6/1987 | Lacey | |
| 4,712,338 A | 12/1987 | Trickel | |
| 4,718,404 A | 1/1988 | Sadler | |
| RE32,607 E | 2/1988 | Smith | |
| 4,724,010 A | 2/1988 | Okaniwa et al. | |
| 4,749,675 A | 6/1988 | Olivier et al. | |
| 4,788,904 A | 12/1988 | Radtke | |
| 4,799,642 A | 1/1989 | Wright | |
| 4,860,509 A | 8/1989 | Laaly et al. | |
| 4,871,917 A | 10/1989 | O'Farrell et al. | |
| 4,905,579 A | 3/1990 | Dame | |
| 4,922,264 A | 5/1990 | Fitzgerald et al. | |
| 4,936,063 A | 6/1990 | Humphrey | |
| 4,966,631 A | 10/1990 | Matlin et al. | |
| 5,031,374 A | 7/1991 | Batch et al. | |
| 5,092,939 A | 3/1992 | Nath | |
| 5,125,608 A | 6/1992 | McMaster et al. | |
| 5,142,293 A | 8/1992 | Ross | |
| 5,164,020 A | 11/1992 | Wagner | |
| 5,228,924 A | 7/1993 | Barker et al. | |
| 5,232,518 A | 8/1993 | Nath et al. | |
| 5,252,141 A | 10/1993 | Inoue et al. | |
| 5,288,619 A | 2/1994 | Brown et al. | |
| 5,316,592 A | 5/1994 | Dinwoodie | |
| 5,409,549 A | 4/1995 | Mori | |
| 5,505,788 A | 4/1996 | Dinwoodie | |
| 5,694,774 A | 12/1997 | Drucker | |
| 5,702,149 A | 12/1997 | Sweeney | |
| 5,741,370 A | 4/1998 | Hanoka | |
| 5,746,839 A | 5/1998 | Dinwoodie | |
| 5,762,720 A | 6/1998 | Hanoka et al. | |
| D408,554 S | 4/1999 | Dinwoodie | |
| 5,983,634 A | 11/1999 | Drucker | |
| 5,986,203 A | 11/1999 | Hanoka et al. | |
| 6,000,663 A | 12/1999 | Plasse et al. | |
| 6,021,862 A | 2/2000 | Sharan | |
| 6,061,978 A | 5/2000 | Dinwoodie et al. | |
| 6,148,570 A | 11/2000 | Dinwoodie et al. | |
| 6,295,818 B1 | 10/2001 | Ansley et al. | |
| 6,313,394 B1 | 11/2001 | Shugar et al. | |
| D453,727 S | 2/2002 | Shugar et al. | |
| 6,495,750 B1 | 12/2002 | Dinwoodie | |
| 6,501,013 B1 | 12/2002 | Dinwoodie | |
| D471,855 S | 3/2003 | Shugar et al. | |
| 6,534,703 B2 | 3/2003 | Dinwoodie | |
| 6,570,084 B2 | 5/2003 | Dinwoodie | |
| 6,586,668 B2 | 7/2003 | Shugar et al. | |
| 6,675,580 B2 | 1/2004 | Ansley et al. | |
| 6,702,370 B2 | 3/2004 | Shugar et al. | |
| 6,809,251 B2 | 10/2004 | Dinwoodie | |
| 6,809,253 B2 | 10/2004 | Dinwoodie | |
| 6,883,290 B2 | 4/2005 | Dinwoodie | |
| D510,315 S | 10/2005 | Shugar et al. | |
| D511,576 S | 11/2005 | Shingleton et al. | |
| RE38,988 E | 2/2006 | Dinwoodie | |
| 7,178,295 B2 | 2/2007 | Dinwoodie | |
| 7,260,918 B2 | 8/2007 | Liebendorfer | |
| 7,328,534 B2 | 2/2008 | Dinwoodie | |
| 7,406,800 B2 | 8/2008 | Cinnamon et al. | |
| 7,434,362 B2 | 10/2008 | Liebendorfer | |
| 7,487,771 B1 | 2/2009 | Eiffert et al. | |
| 7,557,292 B2 | 7/2009 | Shingleton et al. | |
| 7,600,349 B2 | 10/2009 | Liebendorfer | |
| 7,748,175 B2 | 7/2010 | Liebendorfer | |
| 7,766,292 B2 | 8/2010 | Liebendorfer | |
| 7,807,918 B2 | 10/2010 | Shingleton et al. | |
| 7,810,286 B2 | 10/2010 | Eiffert et al. | |
| 7,814,899 B1 | 10/2010 | Port | |
| 7,866,098 B2 | 1/2011 | Cinnamon | |
| 7,888,587 B2 | 2/2011 | Shingleton et al. | |
| 8,061,091 B2 | 11/2011 | Botkin et al. | |
| 8,151,789 B2 * | 4/2012 | Klein | 126/704 |
| 8,307,606 B1 | 11/2012 | Rego et al. | |
| 8,316,618 B1 | 11/2012 | Rodowca et al. | |
| 8,316,619 B1 | 11/2012 | Rego et al. | |
| 8,336,277 B1 | 12/2012 | Rego et al. | |
| 2001/0039960 A1 | 11/2001 | Shugar et al. | |
| 2002/0046764 A1 | 4/2002 | Ansley et al. | |
| 2002/0174889 A1 | 11/2002 | Shugar et al. | |
| 2003/0010372 A1 | 1/2003 | Dinwoodie | |
| 2003/0010374 A1 | 1/2003 | Dinwoodie | |
| 2003/0010375 A1 | 1/2003 | Dinwoodie | |

(56) References Cited

U.S. PATENT DOCUMENTS

| | | |
|---|---|---|
| 2003/0015636 A1 | 1/2003 | Liebendorfer |
| 2003/0015637 A1 | 1/2003 | Liebendorfer |
| 2003/0154666 A1 | 8/2003 | Dinwoodie |
| 2003/0154667 A1 | 8/2003 | Dinwoodie |
| 2003/0154680 A1 | 8/2003 | Dinwoodie |
| 2003/0164187 A1 | 9/2003 | Dinwoodie |
| 2003/0222479 A1 | 12/2003 | Shugar et al. |
| 2004/0007260 A1 | 1/2004 | Dinwoodie |
| 2004/0163338 A1 | 8/2004 | Liebendorfer |
| 2004/0261955 A1 | 12/2004 | Shingleton et al. |
| 2005/0109384 A1 | 5/2005 | Shingleton et al. |
| 2005/0126621 A1 | 6/2005 | Dinwoodie et al. |
| 2005/0144870 A1 | 7/2005 | Dinwoodie |
| 2005/0257453 A1 | 11/2005 | Cinnamon |
| 2006/0196128 A1 | 9/2006 | Duke |
| 2006/0225780 A1 | 10/2006 | Johnson, III et al. |
| 2007/0144575 A1 | 6/2007 | Mascolo et al. |
| 2007/0151594 A1 | 7/2007 | Mascolo et al. |
| 2007/0295392 A1 | 12/2007 | Cinnamon |
| 2007/0295393 A1 | 12/2007 | Cinnamon |
| 2008/0010915 A1 | 1/2008 | Liebendorfer |
| 2008/0029148 A1 | 2/2008 | Thompson |
| 2008/0072951 A1 | 3/2008 | Gabor |
| 2008/0149170 A1 | 6/2008 | Hanoka |
| 2009/0019796 A1 | 1/2009 | Liebendorfer |
| 2009/0078299 A1 | 3/2009 | Cinnamon et al. |
| 2009/0104399 A1 | 4/2009 | Field |
| 2009/0113822 A1 | 5/2009 | Patrina et al. |
| 2009/0134291 A1* | 5/2009 | Meier et al. ............ 248/222.14 |
| 2009/0223142 A1 | 9/2009 | Shingleton et al. |
| 2009/0242014 A1 | 10/2009 | Leary |
| 2009/0266406 A1 | 10/2009 | Duke et al. |
| 2009/0320906 A1 | 12/2009 | Botkin et al. |
| 2010/0089389 A1 | 4/2010 | Seery et al. |
| 2010/0089390 A1 | 4/2010 | Miros et al. |
| 2010/0179678 A1 | 7/2010 | Dinwoodie et al. |
| 2010/0219304 A1 | 9/2010 | Miros et al. |
| 2010/0243023 A1* | 9/2010 | Patton et al. .................. 136/244 |
| 2010/0263297 A1 | 10/2010 | Liebendorfer |
| 2010/0269447 A1 | 10/2010 | Schuit et al. |
| 2010/0275974 A1 | 11/2010 | Chan et al. |
| 2010/0293874 A1 | 11/2010 | Liebendorfer |
| 2010/0319277 A1 | 12/2010 | Suarez et al. |
| 2011/0024582 A1 | 2/2011 | Gies et al. |
| 2011/0067327 A1 | 3/2011 | Eiffert et al. |
| 2011/0088740 A1 | 4/2011 | Mittan et al. |
| 2011/0154774 A1* | 6/2011 | Rawlings ................... 52/745.21 |
| 2012/0031473 A1* | 2/2012 | Chan et al. ................... 136/251 |
| 2012/0048351 A1* | 3/2012 | Rizzo .......................... 136/251 |

FOREIGN PATENT DOCUMENTS

| | | |
|---|---|---|
| DE | 7913751 U1 | 8/1982 |
| DE | 3611542 A1 | 10/1987 |
| DE | 102009051756 A1 | 1/2011 |
| EP | 1602133 B1 | 7/2008 |
| EP | 1665393 B1 | 5/2009 |
| EP | 2056359 A2 | 5/2009 |
| EP | 1476617 B1 | 7/2011 |
| EP | 1412988 B1 | 8/2011 |
| EP | 0991827 B1 | 9/2011 |
| EP | 1476614 B1 | 4/2012 |
| FR | 2451654 A1 | 10/1980 |
| GB | 1564887 A | 4/1980 |
| GB | 2145385 A | 3/1985 |
| GB | 2253379 A | 9/1992 |
| JP | 2006157055 A | 6/2006 |
| JP | 2009224807 A | 10/2009 |
| JP | 2010163862 A | 2/2012 |
| WO | 8000035 A1 | 1/1980 |
| WO | 8000368 A1 | 3/1980 |
| WO | 9003663 A1 | 4/1990 |
| WO | 9202699 A1 | 2/1992 |
| WO | 9400650 A1 | 1/1994 |
| WO | 9600827 A1 | 1/1996 |
| WO | 9738185 A1 | 10/1997 |
| WO | 9829648 A1 | 7/1998 |
| WO | 9859122 A2 | 12/1998 |
| WO | 9947809 A1 | 9/1999 |
| WO | 0046056 A1 | 8/2000 |
| WO | 0101498 A1 | 1/2001 |
| WO | 0216707 A1 | 2/2002 |
| WO | 03007388 A1 | 1/2003 |
| WO | 03017380 A1 | 2/2003 |
| WO | 03017381 A1 | 2/2003 |
| WO | 03041180 A1 | 5/2003 |
| WO | 03071047 A2 | 8/2003 |
| WO | 03071054 A1 | 8/2003 |
| WO | 03072891 A1 | 9/2003 |
| WO | 2004081306 A2 | 9/2004 |
| WO | 2005020290 A2 | 3/2005 |
| WO | 2007076519 A2 | 7/2007 |

OTHER PUBLICATIONS

Peter Toggweiler of PMS Energie AG Mönchaltrorf, "Development of a flat roof integrated photovoltaic system," SOFREL R&D Project (Solar Flat Roof Element) research paper, Mar. 1994, 187 pages (submitted as Exhibit 6 in USDC Case No. 4:08-cv-02807-Sba, Docket Nos. 39-6, 39-7 and 39-8 filed Jan. 21, 2009).

Sep. 6, 2012, Office Action from US Patent and Trademark Office, in U.S. Appl. No. 13/480,237, which is another application of Inventors Rodowca et al.

Sep. 6, 2012, Office Action from US Patent and Trademark Office, in U.S. Appl. No. 13/480,248, which is another application of Inventors Rodowca et al.

Sep. 6, 2012, Office Action from US Patent and Trademark Office, in U.S. Appl. No. 13/480,250, which is another application of Inventors Rodowca et al.

Sep. 13, 2012, Office Action from US Patent and Trademark Office, in U.S. Appl. No. 13/480,254, which is another application of Inventors Rodowca et al.

Jan. 7, 2014, International Preliminary Report on Patentability of the International Searching Authority from the International Bureau of WIPO, in PCT/US/2012/045831, which is an international application of SOLON Corporation, of which all of the above-named inventors were/are employees.

* cited by examiner

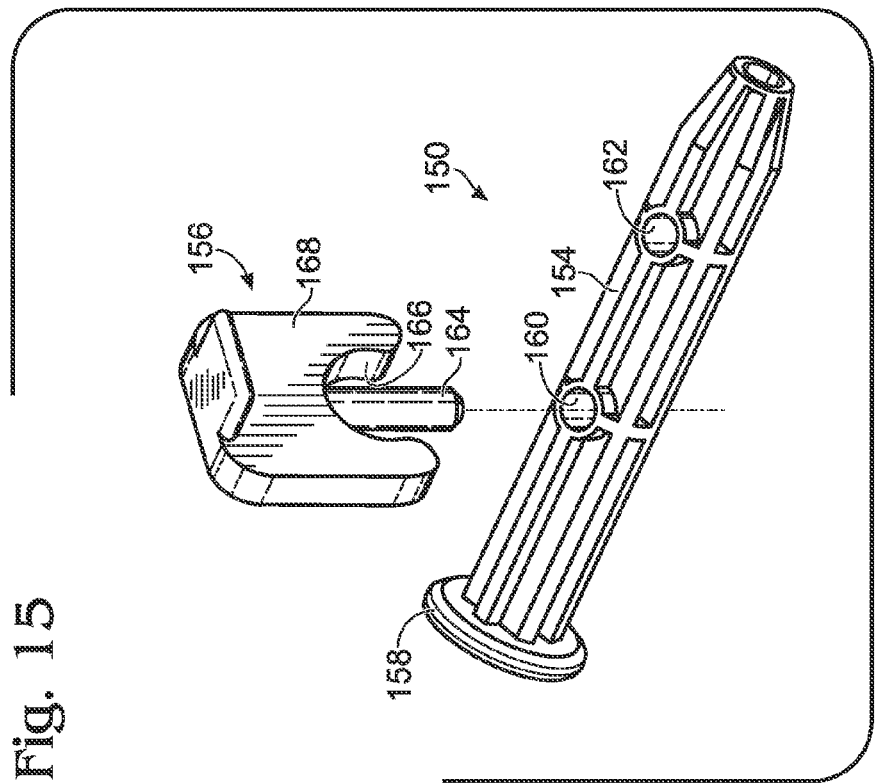
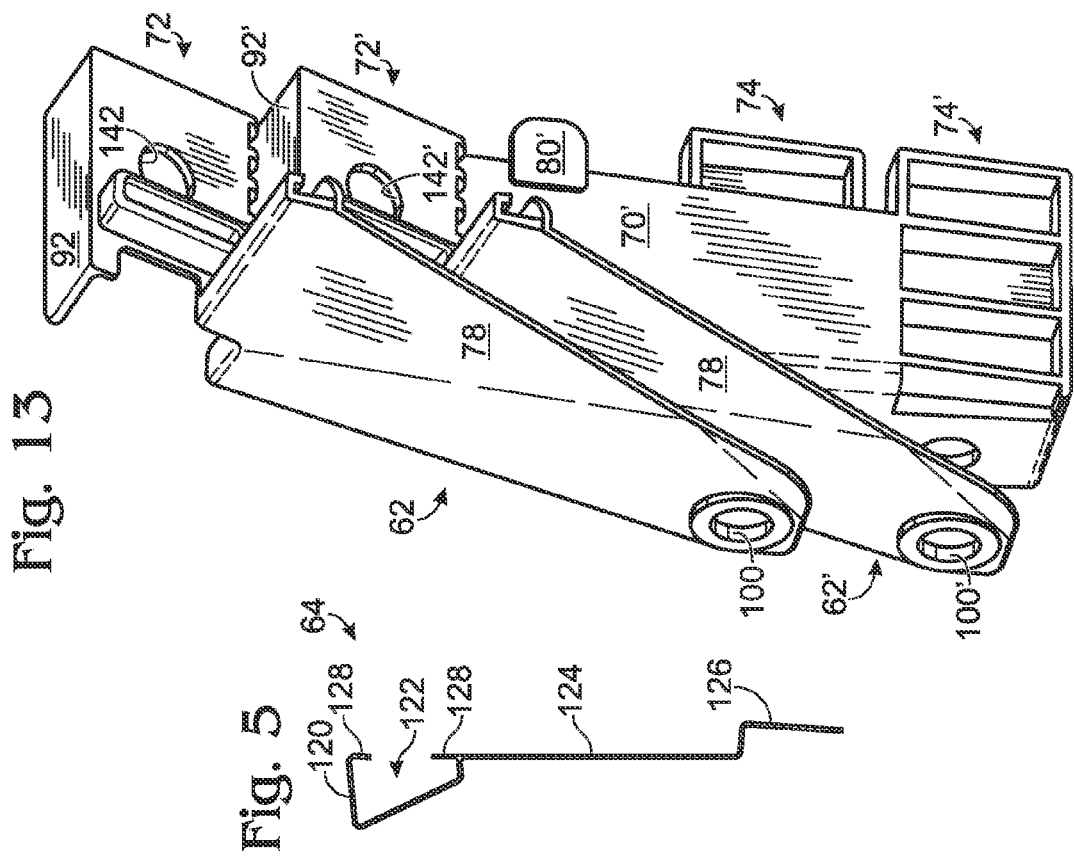

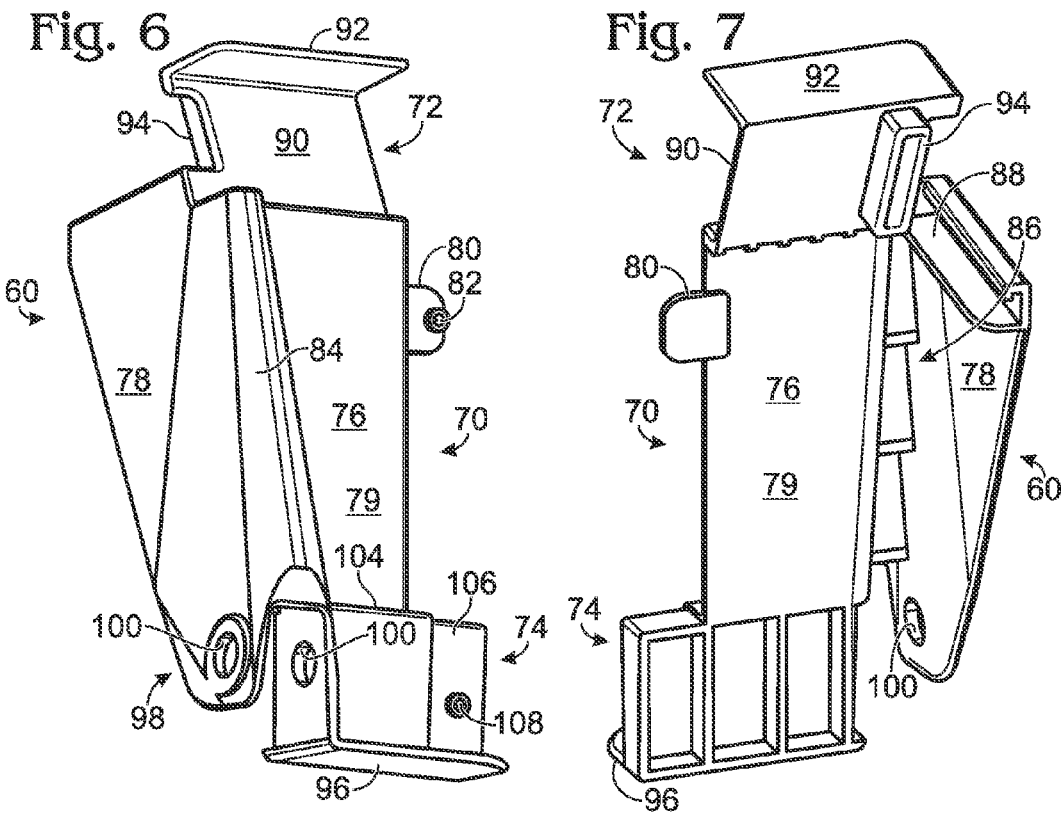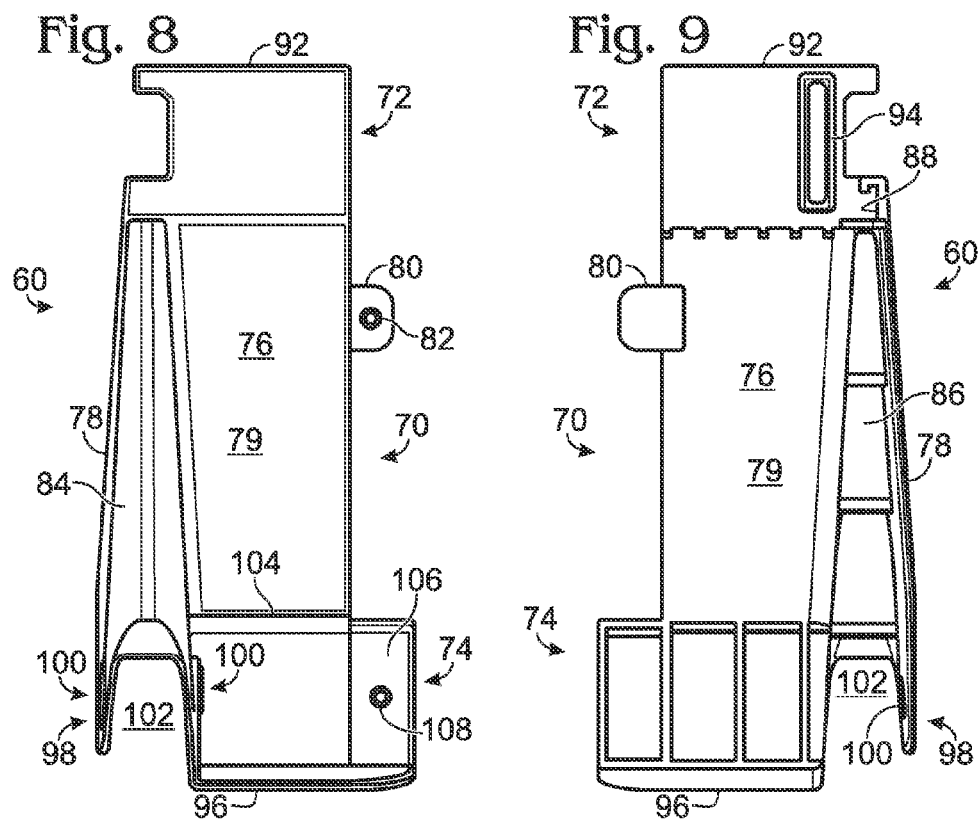

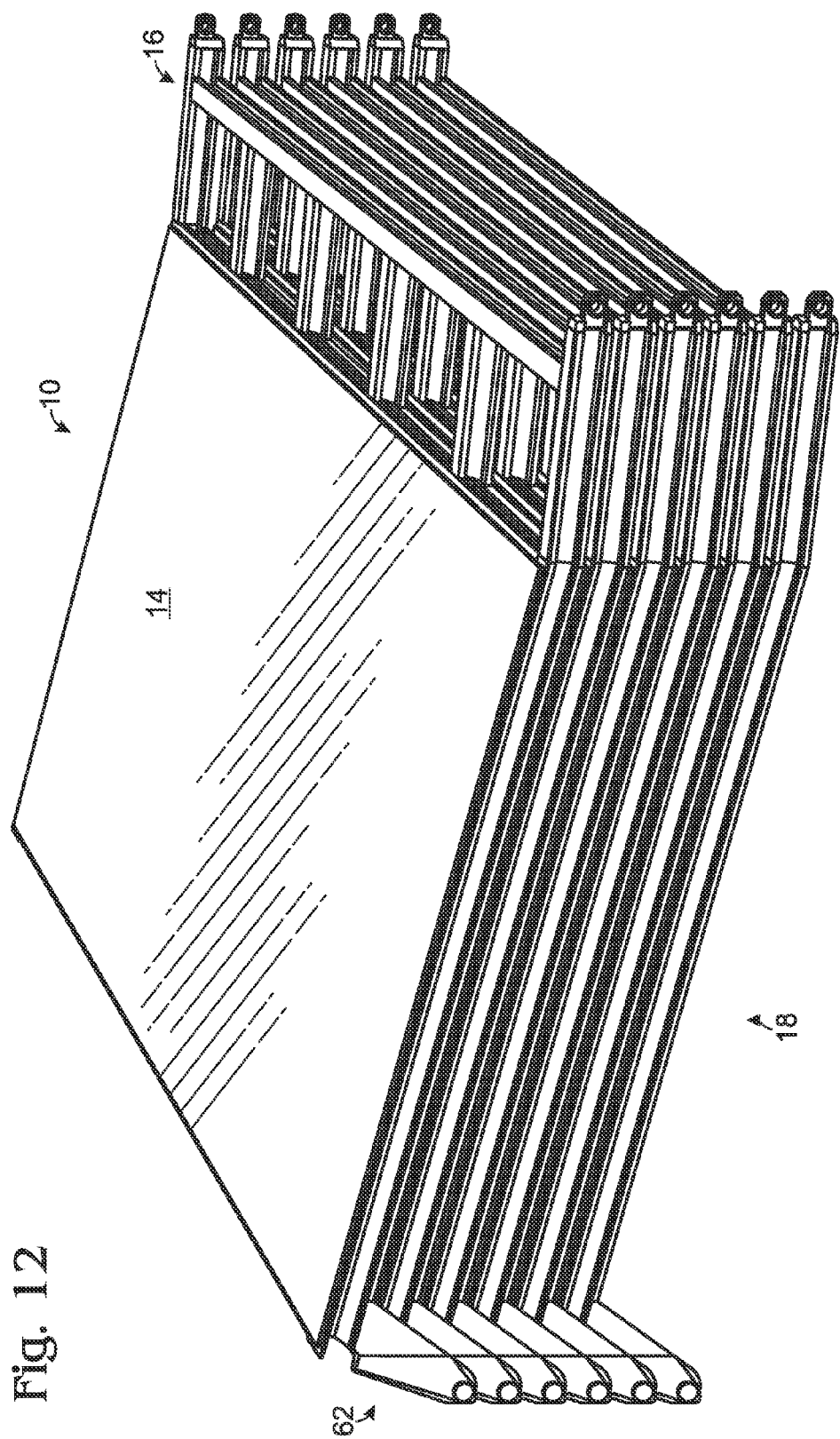

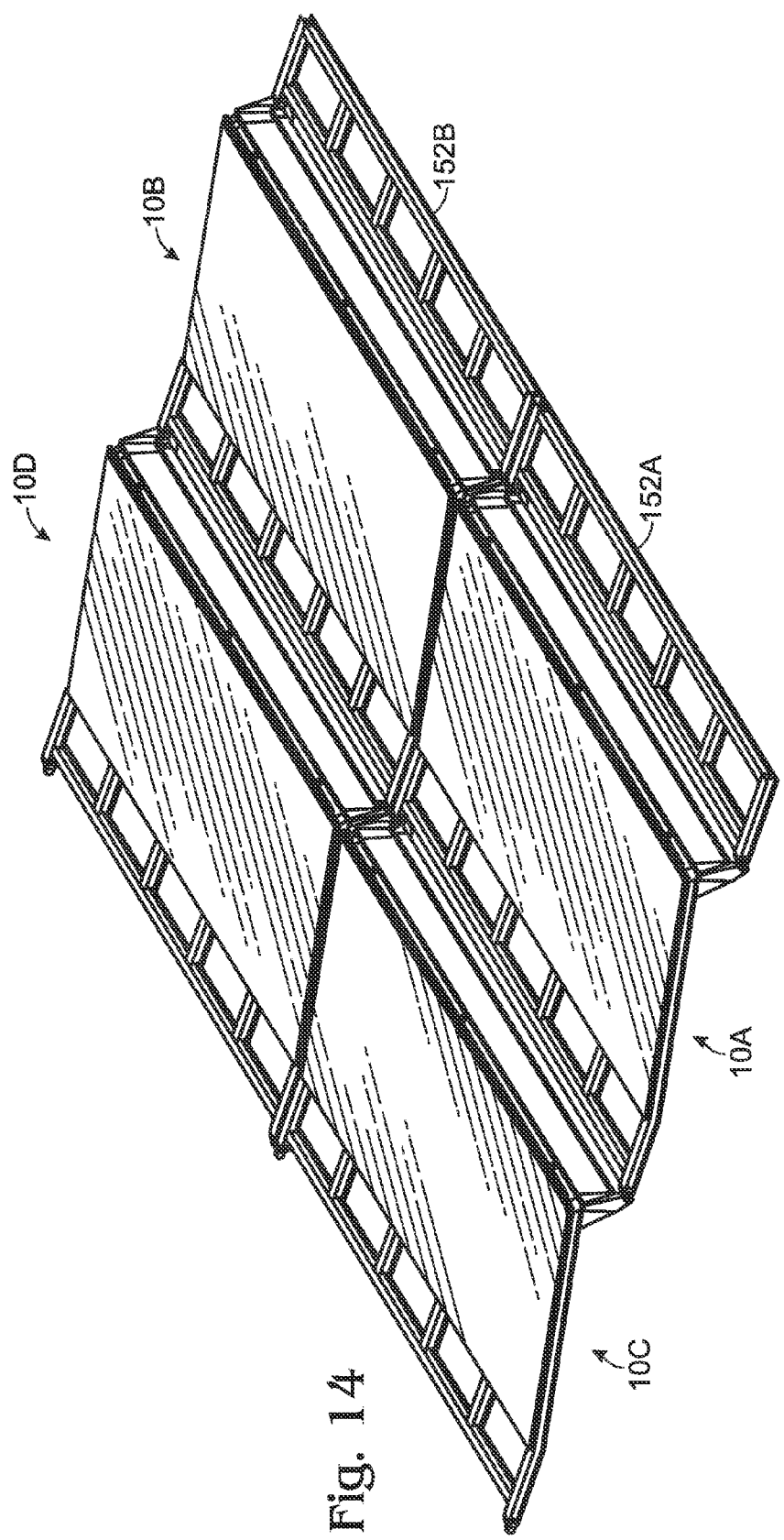

ROOFTOP PHOTOVOLTAIC MODULES

CROSS-REFERENCE TO RELATED APPLICATION

This application claims priority from U.S. Provisional Patent Application Ser. No. 61/725,586, filed Nov. 13, 2012, which is incorporated herein by reference.

INTRODUCTION

Solar, or photovoltaic (PV), panels have been used for decades to create usable electrical power by harnessing the sun's energy. PV panels are usually mounted in suitable locations for maximum exposure to the sun. Frequently, these locations include both industrial and residential building rooftops. Accordingly, various methods and devices have been developed for mounting PV panels on the roofs of buildings.

The terms "solar panels," "photovoltaic panels," and "PV panels," as used in this disclosure, include all types of photovoltaic material suitable for mounting in a generally planar orientation. For example, solar panels suitable for use with the present teachings include those constructed from both thin-film flexible PV material, such as material incorporating copper indium gallium diselenide (CIGS) type semiconductors, and also panels based on more rigid PV material such as crystalline silicon.

Solar panels are typically sold separately from the racks or mounting structures used to install them on a building rooftop. This situation often requires a user to acquire custom-built rack mounting solutions with accompanying high installation costs. One-size-fits-all rack mounting systems are available. However, those systems tend to be complex, heavy, require multiple roof penetrations, and employ metal construction requiring extensive grounding. Existing systems also tend to require assembly by skilled workers and/or the use of one or more tools. Exemplary existing systems are described, for example, in U.S. Pat. Nos. 4,371,139, 5,228,924, 5,505,788, 5,746,839 (reissued as RE038988), 6,495,750, 6,501,013, 6,534,703, 6,570,084, 6,809,251, 6,809,253, and 7,814,899, each of which is hereby incorporated by reference into the present disclosure for all purposes.

Therefore, it is desirable to provide a rooftop PV mounting system that is lightweight, easily transported, and easily installed.

SUMMARY

The present teachings disclose improved PV modules and assemblies of modules, including apparatuses, methods of use, and methods of manufacture. The disclosed assemblies generally include a solar panel integrated with a supporting frame, and are configured to be installed on a building rooftop or stacked for transport. Modules according to the present teachings may be at least partially pre-assembled, with a solar panel oriented at a predetermined angle relative to the rooftop mounting surface of the supporting frame.

BRIEF DESCRIPTION OF THE DRAWINGS

FIG. 3 is a side elevation view of the PV module of FIG. 1.

FIG. 5 is a sectional side view of an illustrative wind deflector suitable for use with a PV module according to aspects of the present disclosure, taken at line 5-5 in FIG. 4.

FIG. 6 is an isometric view of an illustrative riser support suitable for use with a PV module according to aspects of the present disclosure.

FIG. 7 is an isometric view of the reverse side of the riser support of FIG. 6.

FIG. 8 is an elevation view of a riser support similar to the riser support of FIG. 6.

FIG. 9 is an elevation view of the reverse side of the riser support of FIG. 8.

FIG. 12 shows a plurality of illustrative PV modules in a stacked configuration.

FIG. 13 is an isometric view of two illustrative riser supports in a stacked configuration, showing how the supports nest with each other.

FIG. 14 is an isometric view of four illustrative PV modules connected together and including supplemental ballast tray portions.

FIG. 15 is an isometric view of an illustrative connection pin and retaining device.

DETAILED DESCRIPTION

The present teachings describe improved photovoltaic (PV) modules and assemblies of modules, including apparatuses, methods of use, and methods of manufacture. The disclosed assemblies generally include a solar panel integrated with a supporting frame, and are configured to be installed on a building rooftop. Modules according to the present teachings may be at least partially pre-assembled, with a solar panel oriented at a predetermined angle relative to the rooftop mounting surface of the supporting frame. Modules according to the present teachings also may be connected together, both mechanically and electrically, to form assemblies of photovoltaic modules in an improved manner.

Figure 1:
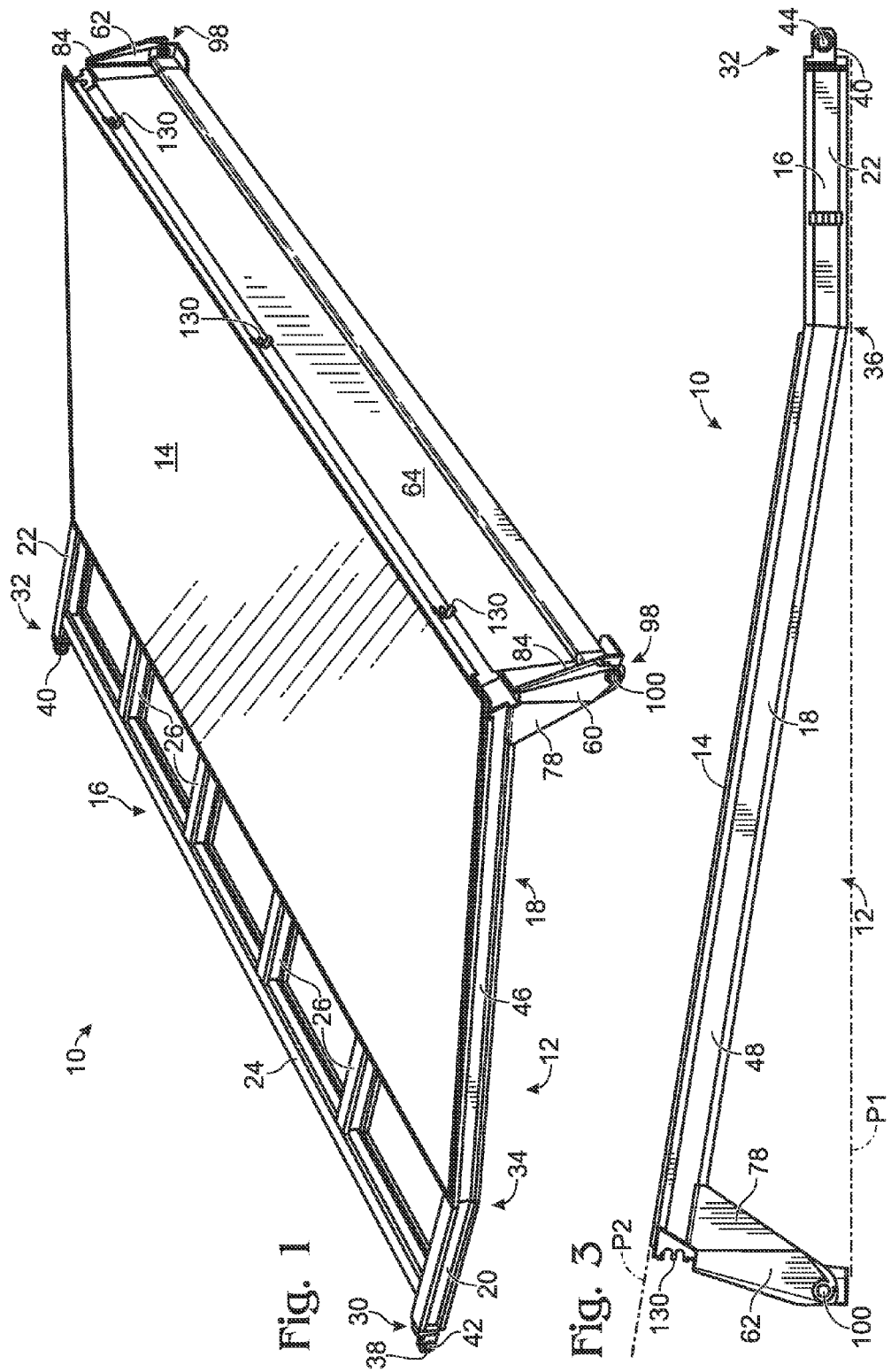
FIG. 1 is an isometric view of a photovoltaic (PV) module according to aspects of the present disclosure.
Figure 2:
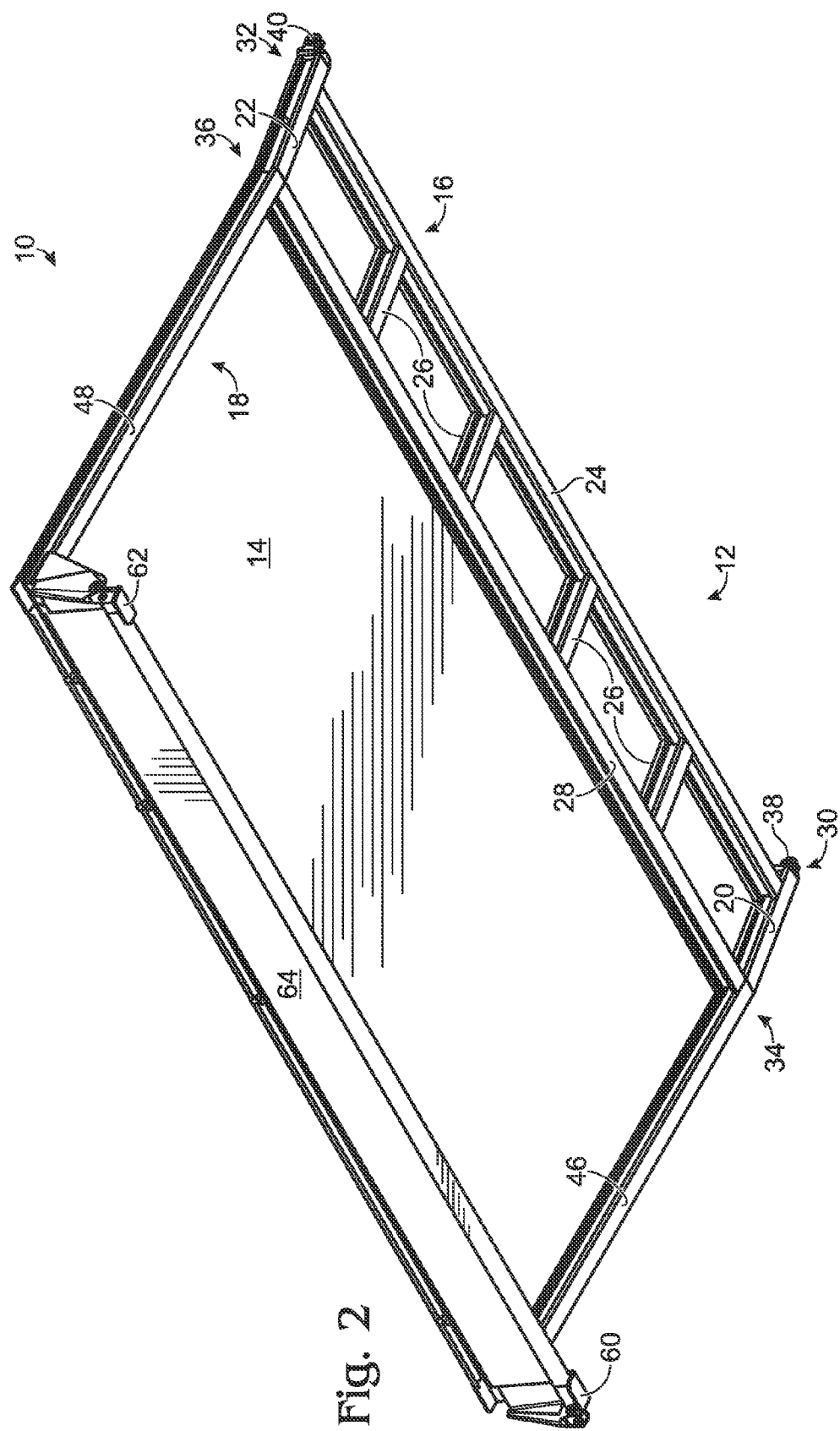
FIG. 2 is an isometric view of the underside of the PV module of FIG. 1.
Figure 4:
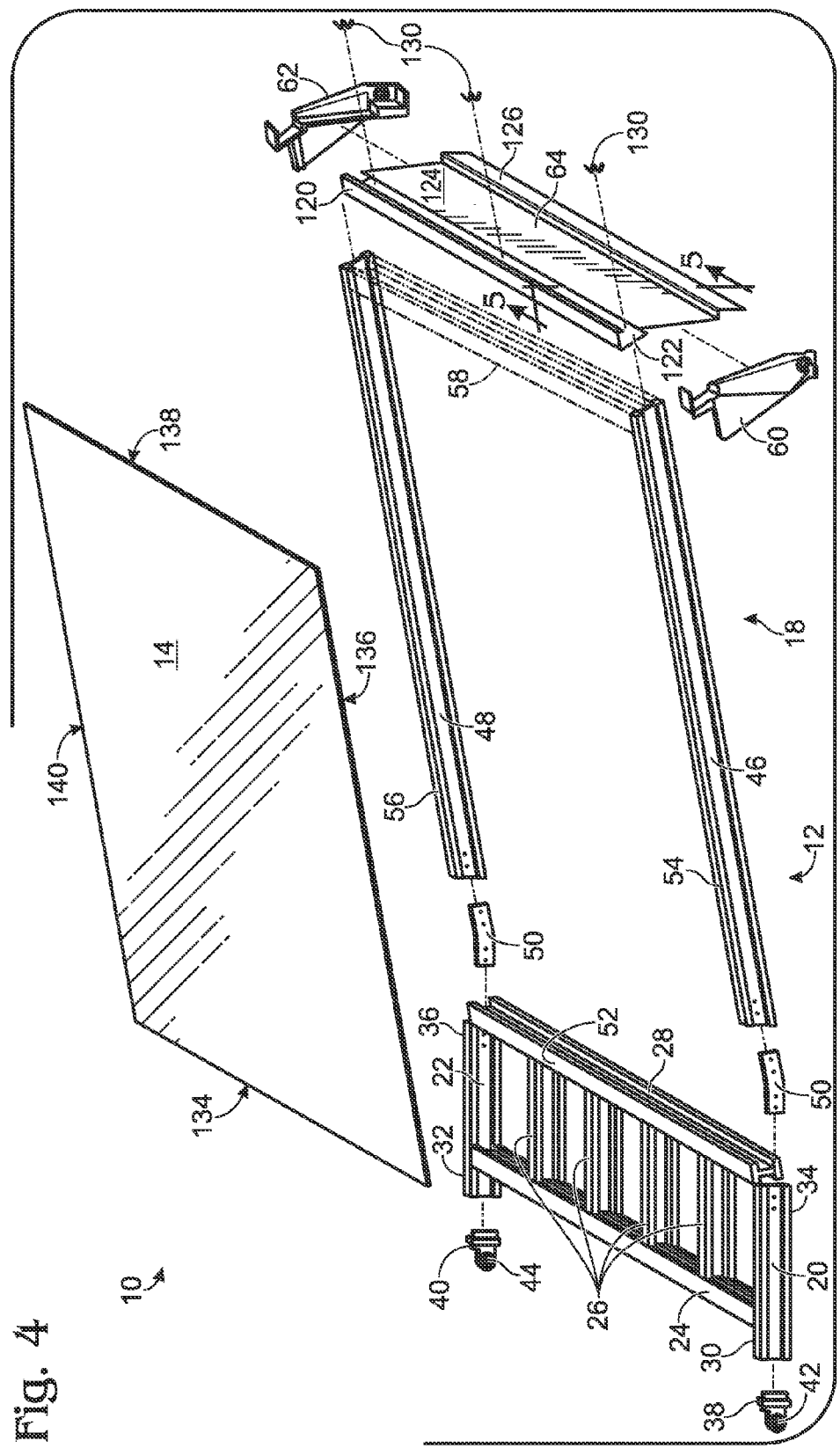
FIG. 4 is an exploded view of the PV module of FIG. 1.

A PV module constructed according to the present disclosure is shown in FIGS. 1 through 4 and generally indicated at 10. FIG. 1 is an overhead isometric view of module 10, and FIG. 2 is an isometric view from an opposite side, i.e., the underside of module 10. FIG. 3 shows a side elevation view of module 10, and FIG. 4 is an exploded view of the module. Unless otherwise specified, PV module 10 and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with PV module 10 may but are not required to be included in other PV modules according to the present disclosure.

With continued reference to FIGS. 1-4, module 10 includes a frame generally indicated at 12, and a photovoltaic (PV) panel 14 mounted upon or otherwise attached to the frame. Frame 12 includes two portions: a first frame portion 16, which is configured to lie flat on a support surface such as a rooftop, and a second frame portion 18, which is angled relative to frame portion 16 and configured to support PV panel 14 at a predetermined angle. The components of frame 12, as well as other components described herein, may be constructed at least in part from non-conductive, extruded materials such as wood and/or wood plastic composite (WPC). A suitable material may include a combination of reclaimed wood fibers and thermoplastic polymer. For example, Fibrex® material manufactured by Andersen Corporation of Bayport, Minn. may be particularly suitable. The use of WPC materials may provide various advantages, such as lighter weight and greater resistance to corrosion, and may avoid the necessity of electrically grounding assemblies of the modules. For similar reasons, module frame portions and other components according to the present disclosure may be more generally constructed from non-conductive, extruded materials. For example, typical plastic materials that are used in extrusion include but are not limited to: polyethylene (PE), polypropylene, acetal, acrylic, nylon (polyamides), polystyrene, polyvinyl chloride (PVC), acrylonitrile butadiene styrene (ABS) and polycarbonate. Such materials may be extruded directly into module frame portions, coextruded in multiple layers with additional materials (including nonconductive materials such as wood filler), or mixed with additives to be extruded as a compound. In any case, the extruded frame portions may be relatively lightweight and strong, and may not require electrical grounding when assembled into one or more module frames.

In this example, first frame portion 16 includes a left side member 20 and a right side member 22 rigidly connected by a front cross member 24. Frame portion 16 is generally configured to support ballast. In some examples, the weight and/or geometry of module 10 is sufficient to keep it secured to an installed location such as a rooftop. In other examples, it may be necessary or desirable to add ballast to ensure that the module or an assembly of modules remains in place.

For example, should modules according to the present disclosure need to be secured to a support surface such as a rooftop or other structure, pavers or other ballast may be disposed on a flat section of the frame structure defined by frame portion 16. In some examples, a tray may be included to support the ballast. In the example shown in FIGS. 1-4, cross ribs or intermediate members 26 are disposed between and parallel to side members 20 and 22. Intermediate members 26 are rigidly connected between front cross member 24 and a panel support cross member 28 running parallel to the front cross member, described in more detail below. Together with front cross member 24, the intermediate members form a flat section of the module suitable for supporting pavers or other ballast. The lower surfaces of frame portion 16 define a first plane P1, which generally lies atop and parallel to a support surface such as a rooftop when installed.

It is also sometimes necessary to mechanically attach a module or assembly of modules (also referred to as an array) to an underlying support surface such as a roof. This may be the case, for example, in areas susceptible to seismic disturbances or high winds. Mechanical attachment devices, which may penetrate and/or clamp to the roof, can be utilized in such situations. One suitable hold-down mechanism is described in U.S. Pat. No. 8,316,618, the entire contents of which are hereby incorporated herein by reference for all purposes.

Left side member 20 and right side member 22 are elongate structures each having a leading end portion (30 and 32, respectively) and a trailing end portion (34 and 36, respectively). Leading end portions 30 and 32 extend beyond the point where front cross member 24 intersects with the side members, and the distal ends of leading end portions 30 and 32 each include a male connector element (38 and 40, respectively), interchangeably referred to as a front connector element. Male connector elements 38 and 40 may include any suitable structures configured to facilitate connection of module 10 to an adjacent, substantially similar module. In this example, connector elements 38 and 40 include extensions or tabs that protrude in a direction continuing from the long axes of the side members. Additionally, male connector elements 38 and 40 each include a transverse aperture (42 and 44) passing from one side of the tab portion to the other in a direction transverse to the long axes of the side members and parallel to P1. Male connector elements 38 and 40, and their interaction with other connector elements, are described further below regarding FIGS. 16-20.

Second frame portion 18 extends from the trailing end portions of side members 20 and 22. Frame portion 18 includes panel support cross member 28 (mentioned above), a left side member 46, and a right side member 48. In the example shown, each side of the module includes a side member of frame portion 16 connected to a side member of frame portion 18. For example, left side member 20 is connected to left side member 46. The respective side members may be rigidly connected by any suitable connection method, such as heat welding, adhesive, and/or connective hardware. As shown in FIG. 4, a shaped insert 50 may be used to facilitate joining of the side members and strengthening of the resulting angled joint. In other examples, not pictured, each side of the module may include a unitary side member that has an angle formed in it, rather than two separate side members joined together. In other examples, not pictured, first frame portion 16 may extend from the rear of module 10 rather than being disposed in the front of module 10 as described above.

Frame portion 18 is oriented at a predetermined, non-zero angle relative to first frame portion 16, and top faces or surfaces (52, 54, and 56) of members 28, 46, and 48 define a second plane P2. While the preceding description refers to a single, predetermined angle between planes P1 and P2 (and thus between the rooftop or other supporting surface and the PV panel), the present teachings are not restricted to this possibility. Rather, in some cases the angle between the first plane and the second plane may be predetermined to have a single value (as shown in FIGS. 1-4), but in other cases (not shown) the angle between the first plane and the second plane may be selectable within a predetermined continuous range, and in still other cases (also not shown) the angle between the first plane and the second plane may be selectable within predetermined discrete values.

As best shown in the exploded view of FIG. 4, panel support cross member 28, or at least upper face 52 of cross member 28, may be oriented at an angle relative to plane P1 of first frame portion 16. In the example shown, cross member 28 is oriented such that upper face 52 lies in and helps to define plane P2. This orientation allows cross member 28 to help support PV panel 14 as a component of second frame portion 18. In some examples, second frame portion 18 includes a rear cross member 58 parallel to and opposite panel support cross member 28. Rear cross member 58, when included, may provide additional support to PV panel 14. Rear cross member 58 is shown in broken lines in FIG. 4 to indicate that remaining examples described herein do not include this cross member. Other examples, described below, instead include a wind deflector that contributes the support that rear cross member 58 would provide.

A pair of riser supports 60 and 62, examples of which are shown in greater detail in FIGS. 6-9, are attached to side members 46 and 48, respectively, supporting the side members at the predetermined angle and providing lateral attachment and support for a rear wind deflector 64. The riser supports are substantially identical, mirror images of each other. With that understanding, a description now proceeds with reference made specifically (where appropriate) only to riser support 60.

Riser support 60 is a single rigid structure including a main body 70, a top support portion 72, and a bottom support and connector portion 74. Main body 70 includes a deflector face 76 and a side wing 78. Deflector face 76 includes any suitable structure configured to connect with rear wind deflector 64 and provides a substantially similar deflector surface parallel to and continuing from deflector 64. In the example shown, deflector face 76 includes a substantially planar wall 79 with a tab 80 extending from wall 79 and recessed behind a major face of the wall to facilitate connection with the wind deflector. Tab 80 may include a boss structure 82, described further below.

Side wing 78 includes a wall structure connected to and oriented at an approximately right angle to deflector face 76. Side wing 78 includes a raised fin 84 forming a channel 86 on an opposite side of the fin. Side wing 78 also extends from the fin partially along the side of module 10, providing additional structural support for the module when installed and preventing side shifting of modules when stacked. The top edge of side wing 78 includes a slot or other side member support 88 configured to provide support for securing side member 46.

Top support portion 72 of riser support 60 extends continuously from the upper edge of deflector face 76. Top support portion 72 includes a wire raceway portion 90, panel support surface 92, and side member end support 94. Wire raceway portion 90 includes a C-shaped wall forming a recess suitable for pass-through of intermodule wiring running along a corresponding raceway in the wind deflector. The upper end of top support portion 72 includes a panel support surface 92, which is a planar surface in plane P2, suitable for facilitating mounting and support of PV panel 14. On a surface opposite wire raceway portion 90, side member end support 94 projects from the riser. End support 94 may include any suitable structure configured to facilitate attachment and support of side member 46. In the example shown, end support 94 is a projection configured to insert into an axial cavity in the end of side member 46, thereby providing support for the side member at the predetermined angle.

Bottom support and connector portion 74 includes a foot in the form of a substantially planar support surface 96 and a connector element 98 formed in a lower portion of fin 84. Connector element 98 may be interchangeably referred to as a rear connector element, and in some examples as a female connector element. Support surface 96 forms a foot on which the riser rests when installed on a support surface such as a rooftop. Riser 60 is configured such that support surface 96 lies in plane P1. In other examples, surface 96 of riser 60 may be absent, and/or the riser may instead rest on a different component such as connector element 98 or another portion of the riser, or even on a separate component such as a connection member (described below). Rear connector element 98 includes a transverse aperture 100, and in the example shown, includes a gap or opening 102 in a rear surface of the fin.

Gap 102 may include any suitable opening or recess configured to engagingly receive or mate with the male connector (38, 40) of another, substantially similar PV module. In these examples, rear connector element 98 may be referred to as a female connector element. In other examples having male and female connector elements, the roles of the elements may be reversed, with front connector elements being female and rear connector elements being male. Upon mating, the apertures of the respective connector elements (98 and 38 or 40) are configured to align coaxially to allow securing of the connection using a connector pin or other suitable connection member or device. Aperture 100 may be thought of as a single aperture running from side to side through fin 84. Aperture 100 may also be thought of as two coaxial apertures in opposing walls of fin 84. In other examples, gap 102 is not included, and the rear surface of fin 84 is closed off. In the gapless examples, such as the one shown in FIG. 20, rear connector element 98 is not intended to mate with a corresponding male connector. A bottom end of fin 84 typically remains open to facilitate stacking of the modules.

Bottom support and connector portion 74 includes a stepped surface 104 corresponding to a stepped profile of wind deflector 64, and a wind deflector connection tab 106. Stepped surface 104 may function as a mechanical stop interfacing with the foot of another module when stacked, as described further below. Tab 106 may include a boss structure 108 similar to boss 82.

Figure 11:
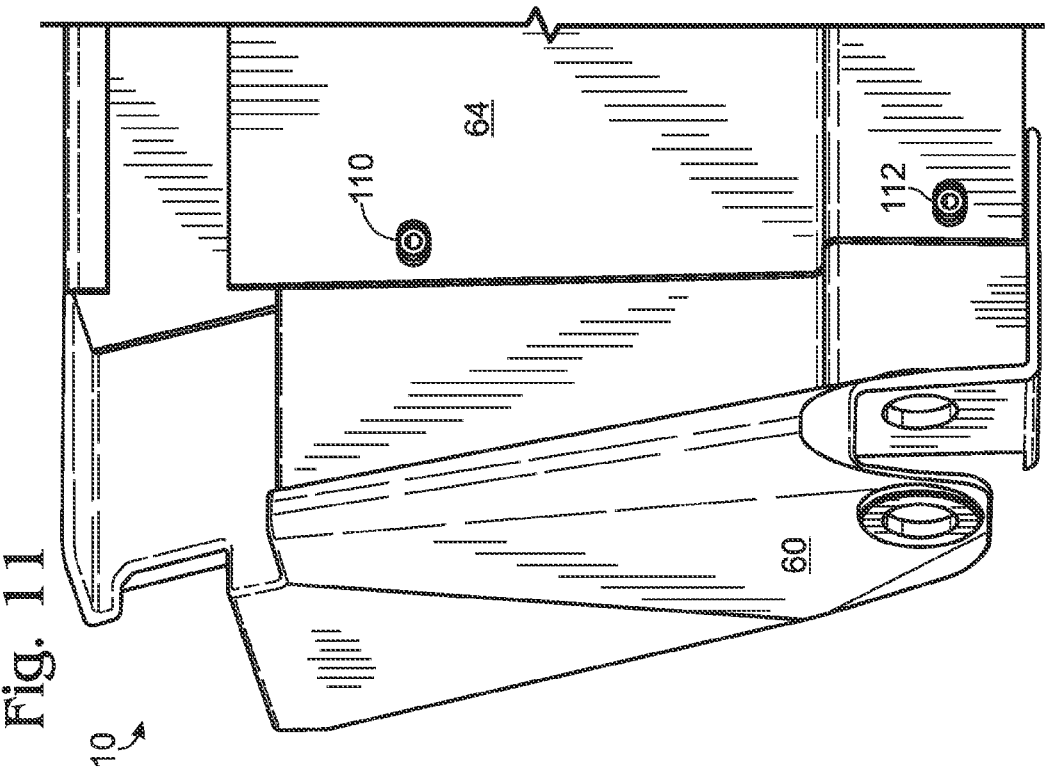
FIG. 11 is an isometric view of the PV module of FIG. 10 with connectors removed to show underlying structure.
Figure 10:
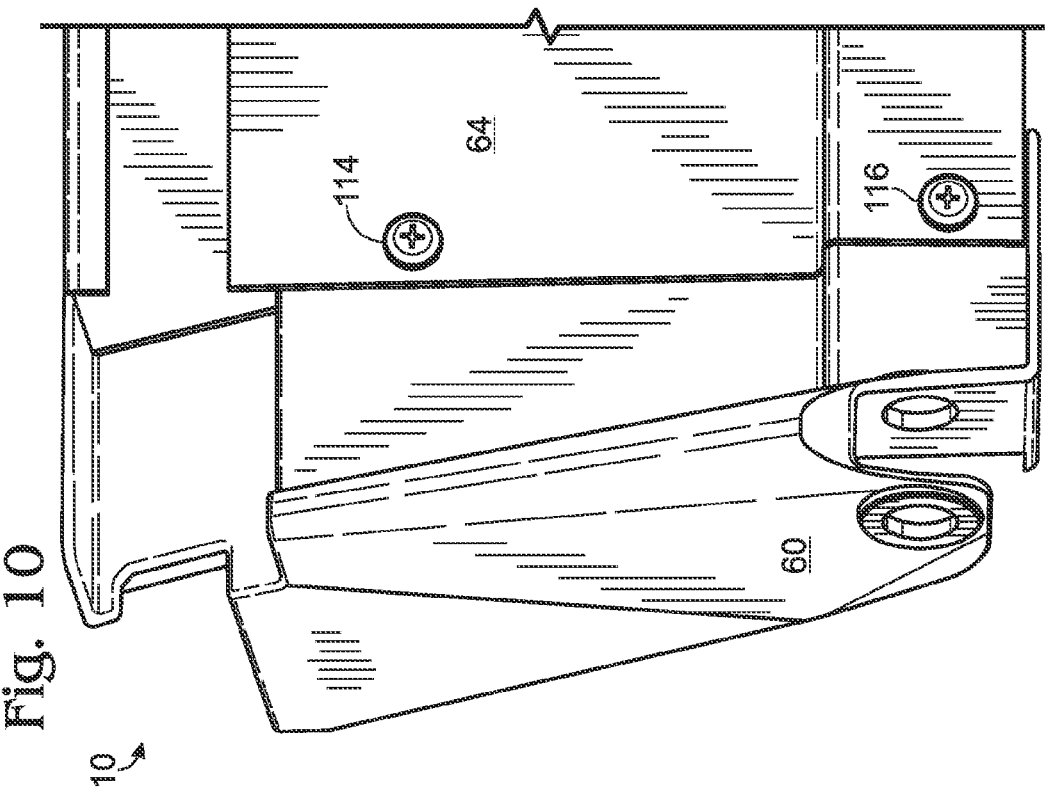
FIG. 10 is an isometric view of a portion of a PV module according to the present disclosure showing an illustrative connection between a riser support and a wind deflector.

Rear wind deflector 64 spans between riser supports 60 and 62, and attaches to the riser supports by any suitable connection method. Turning to FIGS. 10 and 11, one particular connection method is illustrated. In this example, an end portion of deflector 64 includes slots 110 and 112 located such that bosses 82 and 108 of riser 60 fit into the slots and are accessible from the exterior of the module. Screws or bolts 114 and 116 may then be threaded into or through bosses 82 and 108, securing the wind deflector to the riser. Providing a slotted connection allows for thermal expansion and contraction of the components, and accounts for issues such as manufacturing tolerances and flexing during use.

Returning to FIGS. 4 and 5, rear wind deflector 64 is shown in isometric and sectional side views. Rear wind deflector 64 may be any suitable structure configured to prevent or reduce wind from passing under PV panel 14 thereby causing undesired uplift forces. In some examples, such as those shown in the drawings, rear wind deflector 64 may also provide structural support for the PV panel. In the example shown, rear wind deflector 64 is a rigid or semi-rigid, unitary panel including an upper support surface 120 for supporting the PV panel, a wire raceway 122 running longitudinally along an upper length of the deflector, a deflector surface 124, and a stepped portion 126 running along a lower length of the deflector.

Upper support surface 120 includes a planar expanse oriented to lie in plane P2 and configured to provide a supportive mounting surface for PV panel 14. Wire raceway 122 may include any suitable raceway formed in or on rear wind deflector 64 and configured to pass wires, cables, and the like laterally along a module and between adjacent modules. In the example shown, wire raceway 122 includes a C-shaped longitudinal recess formed by the deflector. Raceway 122 includes opposing lips 128, which may facilitate, for example, installation and retention of one or more wire retaining clips 130.

Deflector surface 124 may include any suitable expanse configured to deflect wind, and may include a substantially continuous expanse passing from riser to riser across the rear portion of the module. In the example shown, deflector surface 124 is a rectangular, planar expanse defining a plane that intersects and is transverse to planes P2 and P1. In other words, the deflector is oriented so that a side view of the module (e.g., see FIG. 3) includes a triangle in which a first side is formed by the deflector surface, a second side is formed by plane P1, and a third side is formed by plane P2. The deflector may be oriented at any suitable angle with respect to plane P1. In the example shown, deflector surface 124 is angled at an acute angle relative to plane P1.

PV panel 14 may include any suitable photovoltaic sheet configured to be mountable to module 10. In the example depicted in the drawings, PV panel 14 is a laminated PV sheet that may be bonded to the top of the mounting surface formed by second frame portion 18 and wind deflector 64 to create an integrated module, for example using a suitable adhesive. PV panel 14 is a rigid, substantially planar rectangular sheet having a first side 134, a second side 136, a third side 138, and a fourth side 140. Accordingly, first side 134 is supported by panel support cross member 28, second side 136 is supported by left side member 46, third side 138 is supported by wind deflector 64, and fourth side 140 is supported by right side member 48.

PV module 10 is configured to be stacked with similar modules, as shown in FIGS. 12 and 13. FIG. 12 shows several examples of PV module 10 stacked in a storage and/or transport mode or configuration. In this mode or configuration, the first frame portions of the modules are adjacent and parallel to each other, the second frame portions of the modules are adjacent and parallel to each other, and each riser support of a lower module nests at least partially inside a corresponding riser support of an upper module. This stacking capability is facilitated by the fact that side members 46 and 48 are supported only at their ends. Absence of an intermediate support structure between end portions of the side members allows the PV panel 14 and frame portion 18 of one module 10 to fit into the recess or void defined by the underside of the PV panel 14 and frame portion 18 of another module 10. Additionally, side wings 78 of the risers have walls that extend partially along the side of the module, as described above. Accordingly the side wings pass laterally around and embrace an underlying module nested below, thereby impeding side to side relative motion.

FIG. 13 shows a partial view in which only two riser supports are shown stacked atop each other. As shown, riser supports 62 and 62' are configured such that the fin of a bottom module at least partially fits into, or nests within, the channel of a top module. Additionally, one or more portions of the risers may act as a mechanical stop relative to an adjacent riser to maintain a certain separation or vertical spacing of the stacked modules. Finally, FIG. 13 also shows an aperture (142 and 142') that may be included in each riser support 62. Aperture 142 may include any suitable opening in a riser support configured to pass under-module wiring or cabling through to the exterior of the module for purposes of connection, routing, and the like, as further described below regarding FIG. 21.

FIG. 14 shows a group of four modules connected together, such as when modules are installed on a support surface. Module 10 is configured to be connectable to other PV modules. Specifically, the front and rear connector elements (38, 40, 98) of each side member are configured to receive a connection member 150 for securing module 10 to an adjacent, substantially similar module. For example, FIGS. 14 and 16-19 depict various complete and partial views of four adjacent modules 10A, 10B, 10C, and 10D, each of which is substantially similar or identical to module 10 described above. Accordingly, reference numbers followed by "A," "B," "C" or "D" should be understood to represent respective components of modules 10A, 10B, 10C, or 10D, which are substantially similar to their counterparts in module 10. Additional lettering may be utilized in a similar fashion regarding other drawings.

FIG. 14 also depicts two illustrative supplemental ballast trays 152A and 152B. One or more supplemental ballast trays 152 may be attached along an outer perimeter in order to facilitate securing the modules, and may be configured to function substantially the same as first frame portion 16. Each supplemental ballast tray 152 may include connector elements and members substantially identical to those described with respect to module 10.

Connection member 150 may include any suitable structure or device configured to secure one connector element of module 10 to another connector element of an adjacent module. For example, connection member 150 may include a pin 154 and a retainer device 156 such as the ones shown in FIG. 15. Pin 154 may include an elongate member having an enlarged head portion 158 at one end, and one or more radial apertures such as apertures 160 and 162 spaced along the member. Retention device 156 may include a male portion 164 configured to fit into aperture 160 and 162 as well as a female portion 166 configured to keep the retaining device attached to the pin by friction fitting around the outer circumference of pin 154. Retention device 156 also includes a body portion 168 configured for manual grasping as well as for preventing removal of pin 154 from the aperture of a module connector element.

Figure 17:
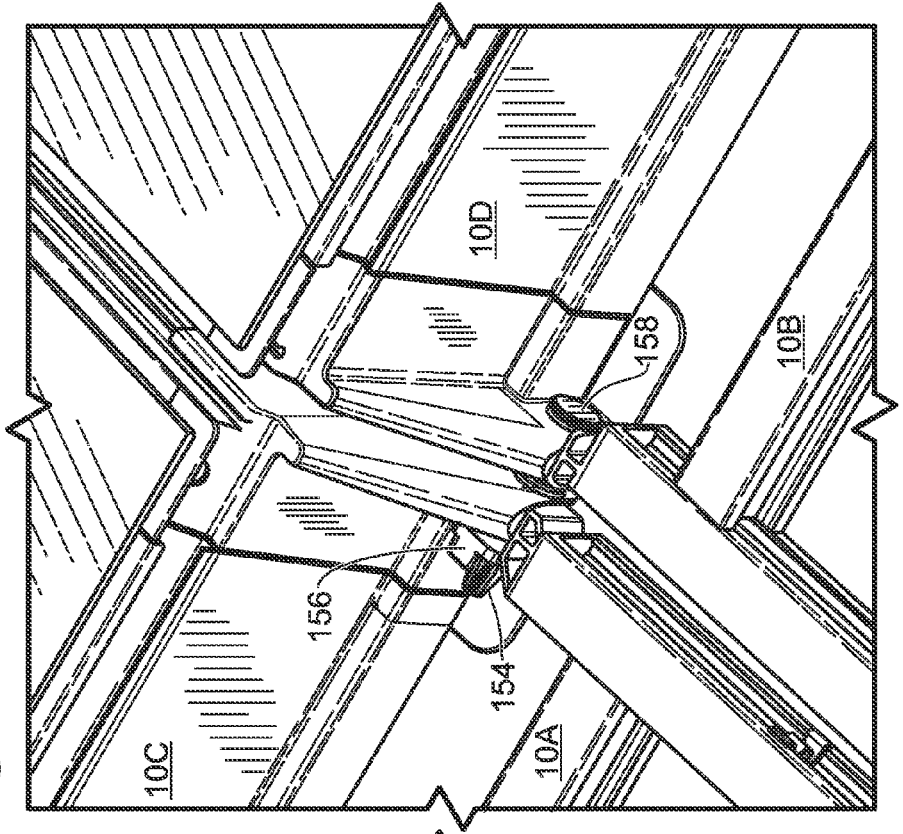
FIGS. 16 and 17 are partial isometric views showing the connection pin of FIG. 15 used to connect four illustrative PV modules.
Figure 16:
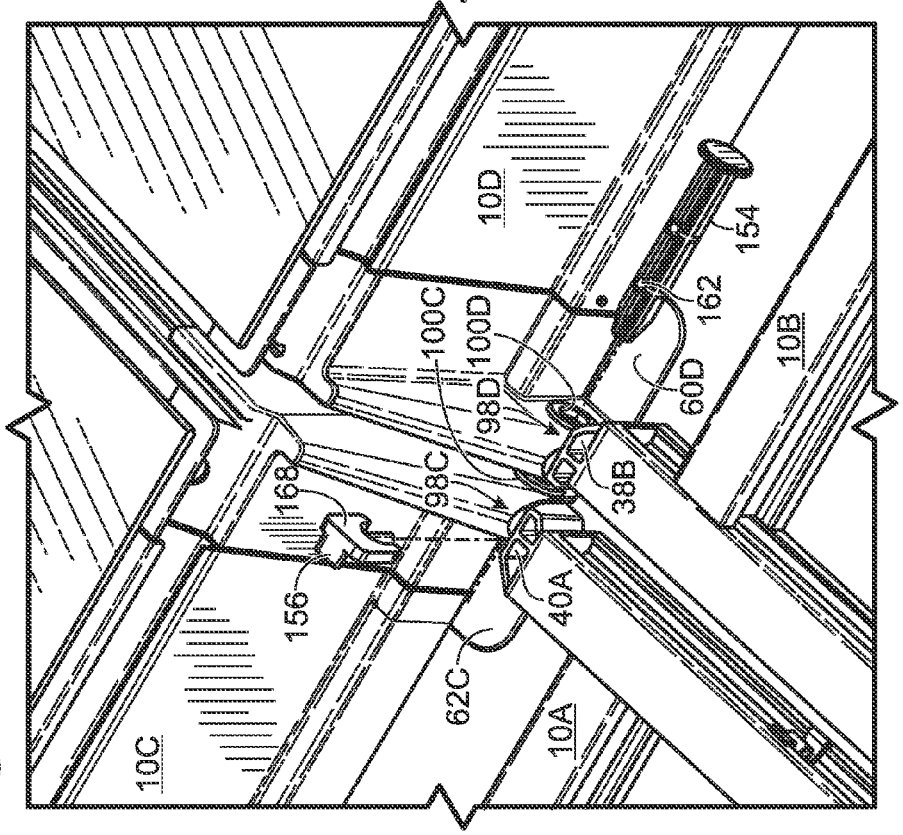

One of apertures 160 and 162 may be selectively utilized depending on the width of the connector elements to be secured. For example, as shown in FIGS. 16 and 17, modules 10A, 10B, 10C, and 10D are all secured to one another by first inserting male connector element 40A into female connector element 98C of riser 62C, and inserting male connector element 38B into female connector element 98D of riser 60D. Then, pin 154 is inserted into and through the aligned apertures 42B, 44A, 100C, and 100D. Finally, retention device 156 is inserted into aperture 162 and snapped into place around pin 154. Body portion 168 then prevents pin 154 from being removed from the connector elements.

Figure 18:
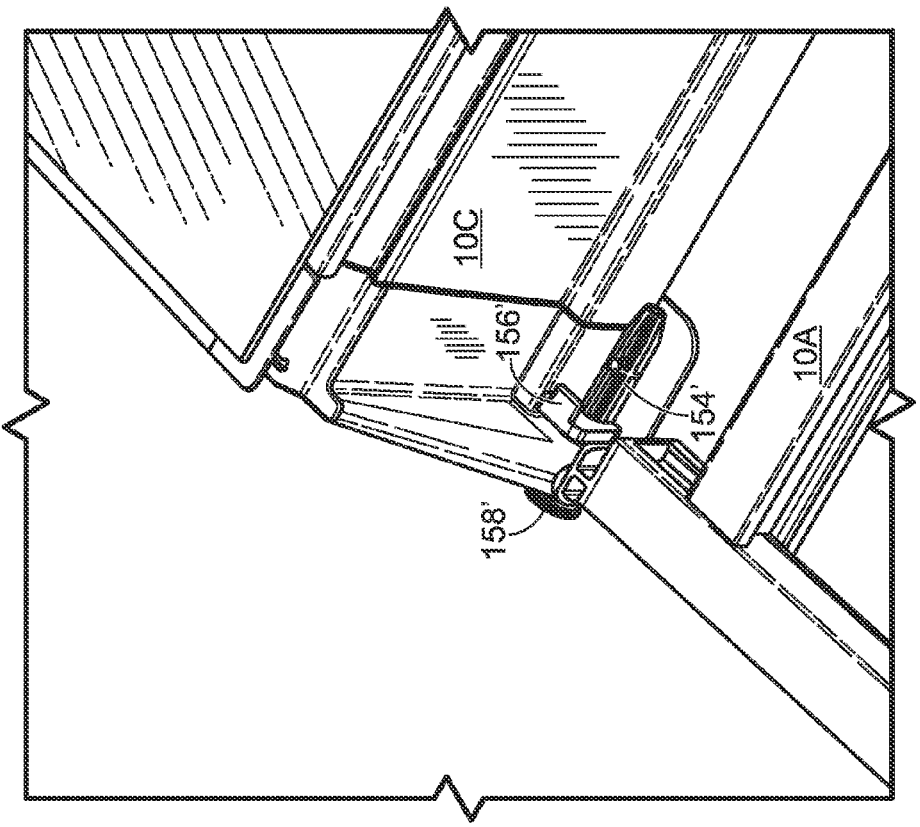
FIGS. 18 and 19 are partial isometric views showing the connection pin of FIG. 15 used to connect two illustrative PV modules.
Figure 19:
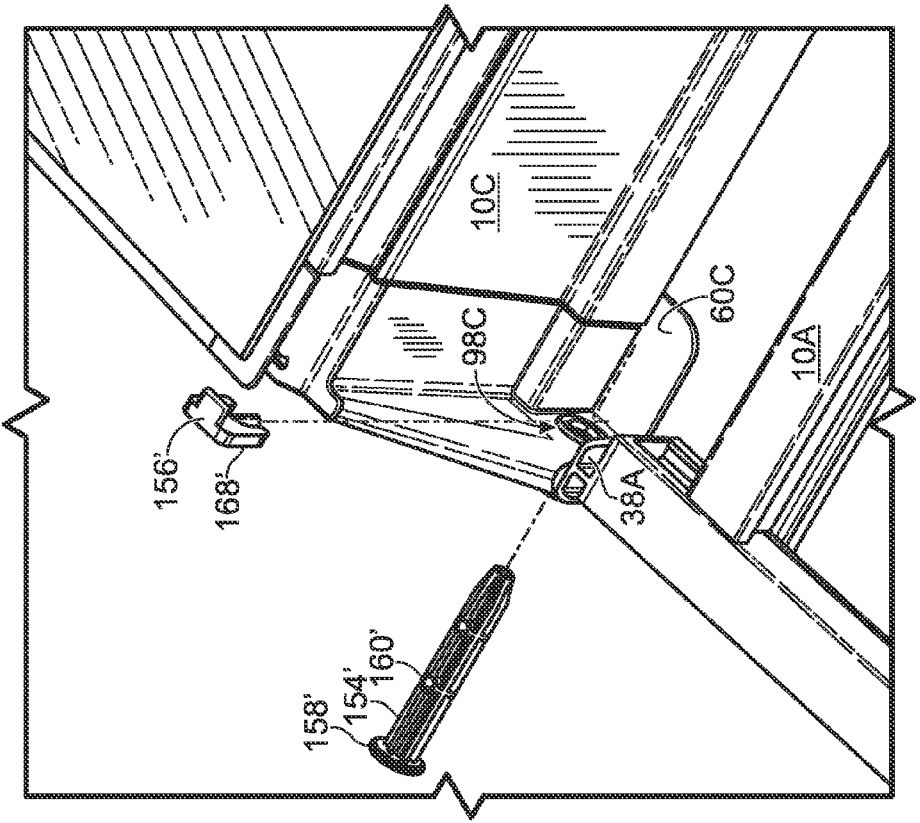

Similarly, pin 154' and retention device 156' may be used as shown in FIGS. 18 and 19 to secure module 10A to module 10C. Here, only connector elements 38A and 98C of riser 60C are involved, so the width of the engaged connector elements is narrower, and retention device 156' can be inserted into aperture 160', which is closer to head portion 158', after the pin is passed through the engaged connector elements.

Figure 20:
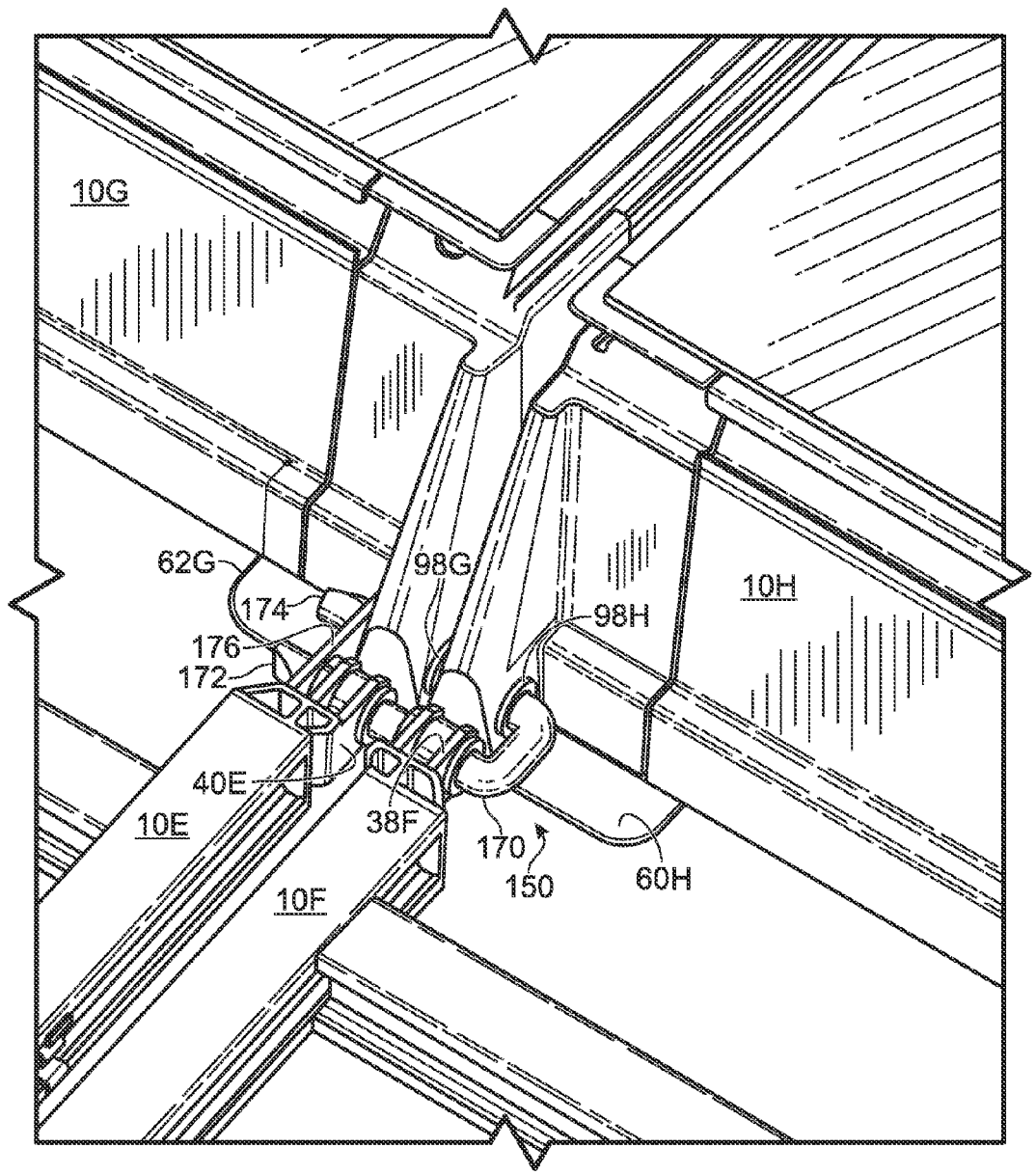
FIG. 20 is a partial isometric view showing an illustrative U-bolt used to connect four illustrative PV modules.

In a different example, connection member 150 may instead include a U-bolt 170. U-bolt 170 may include any suitable U-shaped structure having two legs 172 and 174 joined in a fixed relationship at one end by a transition portion. When utilized, rather than inserting a male connector element of one module into a female connector element of another when attaching adjacent modules 10, connector elements may be situated adjacent to each other. The apertures of adjacent modules may be spaced at a distance corresponding to the spacing between legs 172 and 174. U-bolt 170 may then be inserted into the adjacent apertures and distal ends of the legs may be secured by a retaining device 176 as shown in FIG. 20. In the example shown, four modules, 10E, 10F, 10G, and 10H, are connected together using U-bolt 170 at connector elements 40E, 38F, 98G of riser 62G, and 98H of riser 60H. As described above, connector elements 98G and 98H in this example do not include opening 102. This may facilitate installation using this type of module and connection member by preventing inadvertent insertion of one connector element into another.

Figure 21:
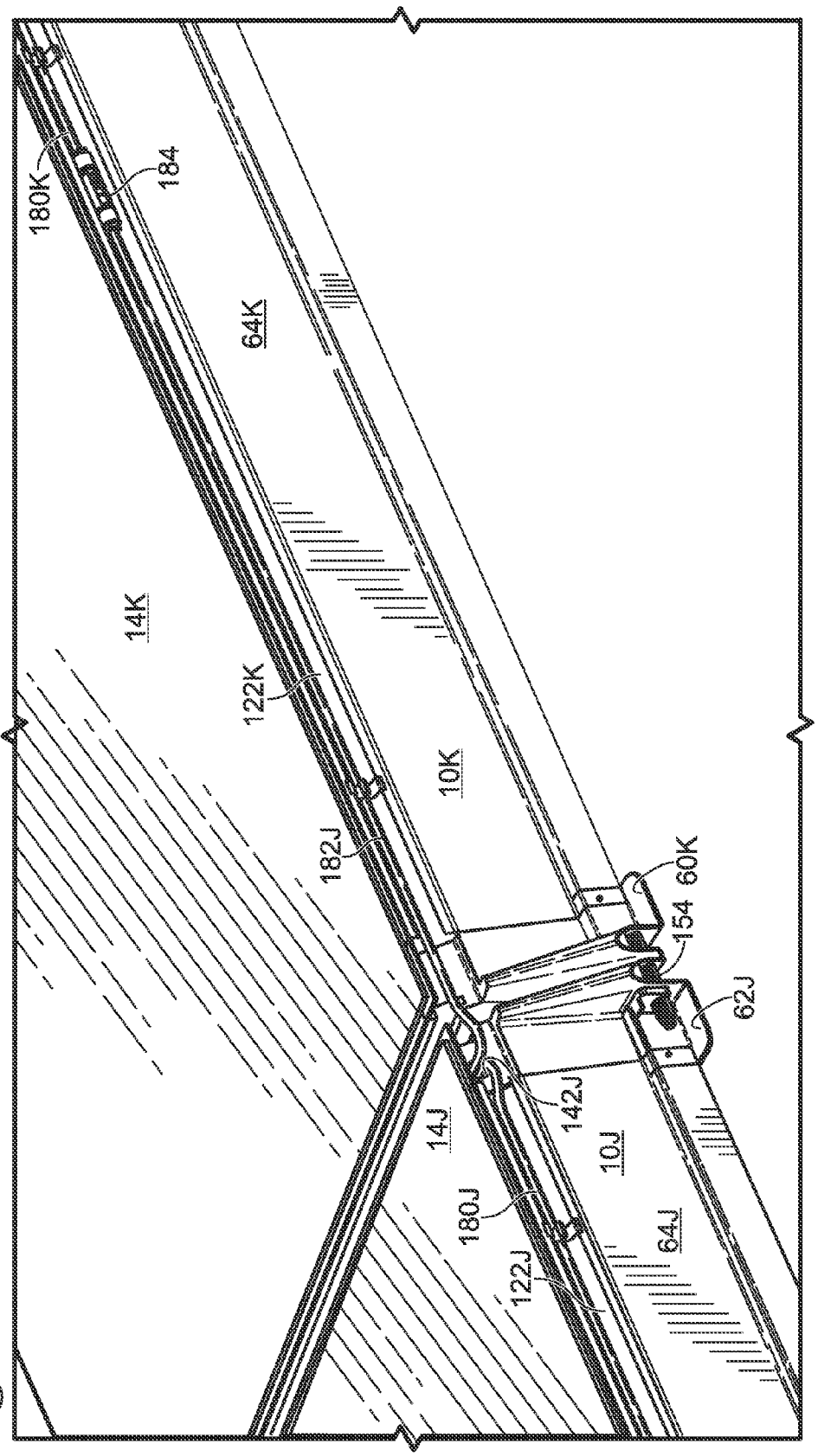
FIG. 21 is a partial isometric view showing illustrative routing and connection of intermodule wiring.

FIG. 21 shows adjacent modules 10J and 10K connected side by side. As is typical in a PV installation, each module 10 may include electrical cabling or wiring such as cables 180J, 182J, and 180K shown in FIG. 21. Riser support 62 of each module 10 includes aperture 142, as described above. Accordingly, cables 180J and 182J are passed from an underside of PV panel 14J through aperture 142J and into wire raceway 122J of rear deflector 64J. The cables then proceed in opposite directions, with cable 182J proceeding toward module 10K to connect with cable 180K at connector 184. In this fashion, adjacent PV modules may be electrically connected in series. In other examples, modules may be connected in series, in parallel, or in any combination thereof.

EXAMPLES

Based on the above description and the associated drawings, the following examples describe various embodiments of apparatuses and methods of the disclosure.

A0. A photovoltaic module comprising:
  a first frame portion including first and second opposing side members defining a first plane, each of the first and second side members having a leading end portion and a trailing end portion, and a cross member connecting the first and second side members, the first frame portion configured to support ballast;
  a second frame portion including third and fourth opposing side members extending respectively from the trailing end portions of the first and second side members, upper faces of the third and fourth opposing side members defining a second plane oriented at a predetermined angle relative to the first plane, each of the third and fourth side members having a leading end portion adjacent the first frame portion and a trailing end portion opposite the leading end portion;
  a photovoltaic panel supported by upper faces of the third and fourth side members and lying substantially parallel to the second plane; and
  a pair of opposing riser supports connected respectively to the trailing end portions of the third and fourth side members, the pair of riser supports configured to support the third and fourth side members at the predetermined angle;
  wherein the photovoltaic module is configured to be stackable atop a substantially identical module in a storage configuration in which the first frame portions of the modules are adjacent and parallel to each other, the second frame portions of the modules are adjacent and parallel to each other, and each riser support of the lower module nests at least partially inside a corresponding riser support of the upper module.

A1. The module of paragraph A0, wherein the cross member is a first cross member, the module further comprising a second cross member connecting the trailing end portions of the first and second side members, the second cross member having an upper face lying in the second plane.

A2. The module of paragraph A1, wherein the photovoltaic panel is further supported by the second cross member.

A3. The module of paragraph A1, further including a plurality of intermediate members each transversely connecting the first and second cross members.

A4. The module of paragraph A0, wherein the first frame portion further includes a tray for holding ballast.

A5. The module of paragraph A0, further comprising a wind deflector spanning the pair of riser supports, the wind deflector including a support surface lying in the second plane, the photovoltaic panel being further supported by the support surface of the wind deflector.

A6. The module of paragraph A0, further comprising a wind deflector spanning the pair of riser supports, the wind deflector including a deflector surface oriented transverse to the first and second planes, and a raceway running between the pair of riser supports and configured to retain intermodule wiring.

A7. The module of paragraph A0, wherein one riser support of the pair of riser supports includes a single aperture configured to pass one or more electrical cables therethrough.

A8. The module of paragraph A0, wherein the first, second, third, and fourth side members are constructed from a wood plastic composite material.

A9. The module of paragraph A0, wherein the leading end portion of the first side member includes a first connector element having an aperture oriented parallel to the first plane and perpendicular to a long axis of the first side member.

A10. The module of paragraph A9, wherein one riser support of the pair of riser supports includes a second connector element having an aperture oriented parallel to the aperture of the first connector element.

A11. The module of paragraph A10, wherein the second connector element is configured to matingly engage with the first connector element of an adjacent, substantially similar module.

A12. The module of paragraph A11, wherein the first connector element is a male connector element and the second connector element is a female connector element.

A13. The module of paragraph A0, each riser support of the pair of riser supports including a side wall configured to restrict relative lateral motion between the module and an adjacent stacked module.

A14. The module of paragraph A0, each riser support of the pair of riser supports including a mechanical stop configured to maintain spacing of adjacent stacked modules.

A15. The module of paragraph A0, wherein the first and third side members comprise a unitary member having an angle formed therein.

A16. The module of paragraph A0, further including a third cross member connecting trailing end portions of the third and fourth side members.

A17. The module of paragraph A0, wherein a lower end of each of the riser supports lies in the first plane.

B0. A photovoltaic module comprising:
  a first frame portion including first and second opposing side members defining a first plane, each of the first and second side members having a leading end portion and a trailing end portion, and a cross member connecting the first and second side members, the first frame portion configured to support ballast;
  a second frame portion including third and fourth opposing side members extending respectively from the trailing end portions of the first and second side members, upper faces of the third and fourth opposing side members defining a second plane oriented at a predetermined angle relative to the first plane, each of the third and fourth side members having a leading end portion adjacent the first frame portion and a trailing end portion opposite the leading end portion;
  a photovoltaic panel supported by upper faces of the third and fourth side members and lying substantially parallel to the second plane; and
  a pair of opposing riser supports connected respectively to the trailing end portions of the third and fourth side members, the pair of riser supports configured to support the third and fourth side members at the predetermined angle;

wherein, when the module is installed on a substantially planar support surface, the third and fourth side members are supported only at the respective leading and trailing end portions.

B1. The module of paragraph B0, wherein the first and third side members comprise a unitary member having an angle formed therein.

B2. The module of paragraph B0, wherein the cross member is a first cross member, the module further comprising a second cross member connecting the trailing end portions of the first and second side members, the second cross member having an upper face lying in the second plane.

B3. The module of paragraph B2, wherein the photovoltaic panel is further supported by the second cross member.

B4. The module of paragraph B2, further including a third cross member connecting trailing end portions of the third and fourth side members.

B5. The module of paragraph B0, further comprising a wind deflector spanning the pair of riser supports, the wind deflector including a support surface lying in the second plane, the photovoltaic panel being further supported by the support surface of the wind deflector.

B6. The module of paragraph B5, the wind deflector further including a deflector surface oriented transverse to the first and second planes, and a raceway running between the pair of riser supports and configured to retain intermodule wiring.

B7. The module of paragraph B0, wherein one riser support of the pair of riser supports includes a single aperture configured to pass one or more electrical cables therethrough.

B8. The module of paragraph B0, wherein the first, second, third, and fourth side members are constructed from a wood plastic composite material.

B9. The module of paragraph B0, wherein the leading end portion of the first side member includes a first connector element having an aperture oriented parallel to the first plane and perpendicular to a long axis of the first side member.

B10. The module of paragraph B9, wherein one riser support of the pair of riser supports includes a second connector element having an aperture oriented parallel to the aperture of the first connector element.

B11. The module of paragraph B10, wherein the second connector element is configured to matingly engage with another connector element substantially similar to the first connector element.

B12. The module of paragraph B11, wherein the first connector element is a male connector element and the second connector element is a female connector element.

B13. The module of paragraph B0, wherein a lower end of each of the riser supports lies in the first plane.

C0. A photovoltaic module comprising:
 a first frame portion including first and second opposing side members defining a first plane, each of the first and second side members having a leading end portion and a trailing end portion, and a cross member connecting the first and second side members, the first frame portion configured to support ballast;
 a second frame portion including third and fourth opposing side members extending respectively from the trailing end portions of the first and second side members, upper faces of the third and fourth opposing side members defining a second plane oriented at a predetermined angle relative to the first plane, each of the third and fourth side members having a leading end portion adjacent the first frame portion and a trailing end portion opposite the leading end portion;
 a pair of opposing riser supports connected respectively to the trailing end portions of the third and fourth side members, the pair of riser supports configured to support the third and fourth side members at the predetermined angle;
 a wind deflector spanning the pair of riser supports, the wind deflector having a support surface lying in the second plane and a deflector surface intersecting the second plane; and
 a photovoltaic panel lying substantially parallel to the second plane, the panel being supported on a first side by the upper face of the third side member, on a second side by the upper face of the fourth side member, and on a third side by the support surface of the wind deflector.

C1. The module of paragraph C0, wherein the cross member is a first cross member, the module further comprising a second cross member connecting the trailing end portions of the first and second side members, the second cross member having an upper face lying in the second plane.

C2. The module of paragraph C1, wherein the photovoltaic panel is further supported by the second cross member.

C3. The module of paragraph C1, further including a plurality of intermediate members each transversely connecting the first and second cross members.

C4. The module of paragraph C0, wherein the first frame portion further includes a tray for holding ballast.

C5. The module of paragraph C0, the wind deflector further including a raceway running between the pair of riser supports and configured to retain intermodule wiring.

C6. The module of paragraph C0, wherein one riser support of the pair of riser supports includes a single aperture configured to pass one or more electrical cables therethrough.

C7. The module of paragraph C0, wherein the first, second, third, and fourth side members are constructed from a wood plastic composite material.

C8. The module of paragraph C0, wherein the leading end portion of the first side member includes a first connector element having an aperture oriented parallel to the first plane and perpendicular to a long axis of the first side member.

C9. The module of paragraph C8, wherein one riser support of the pair of riser supports includes a second connector element having an aperture oriented parallel to the aperture of the first connector element.

C10. The module of paragraph C9, wherein the second connector element is configured to matingly engage with the first connector element of an adjacent, substantially similar module.

C11. The module of paragraph C10, wherein the first connector element is a male connector element and the second connector element is a female connector element.

C12. The module of paragraph C0, wherein a lower end of each of the riser supports lies in the first plane.

D0. A photovoltaic assembly comprising at least first and second substantially similar photovoltaic modules, each module including:
 a first frame portion including first and second opposing side members defining a first plane, each of the first and second side members having a leading end portion including a front connector element and a trailing end portion, and a cross member connecting the first and second side members, the first frame portion configured to support ballast;
 a second frame portion including third and fourth opposing side members extending respectively from the trailing end portions of the first and second side members, upper faces of the third and fourth opposing side members defining a second plane oriented at a predetermined angle relative to the first plane, each of the third and fourth side members having a leading end portion adjacent the first frame portion and a trailing end portion opposite the leading end portion;

a photovoltaic panel supported by upper faces of the third and fourth side members and lying substantially parallel to the second plane; and a pair of opposing riser supports connected respectively to the trailing end portions of the third and fourth side members, the pair of riser supports configured to support the third and fourth side members at the predetermined angle, and each of the riser supports including a rear connector element;

wherein, when the module is installed on a substantially planar support surface, the third and fourth side members are supported only at the respective leading and trailing end portions; and wherein the second module is disposed longitudinally adjacent to and laterally aligned with the first module, and each of the front connector elements of the second module is configured to be secured to a corresponding adjacent rear connector element of the first module by inserting a connection member.

D1. The assembly of paragraph D0, wherein each of the front and rear connector elements includes a transverse aperture.

D2. The assembly of paragraph D1, wherein each of the front connector elements of the second module is configured to matingly engage with a corresponding rear element of the first module to form mated male and female connector element pairs having coaxially aligned apertures.

D3. The assembly of paragraph D2, wherein each mated connector element pair is configured to be secured by passing the connection member through the aligned apertures of the front and rear connector elements.

D4. The assembly of paragraph D3, wherein the connection member comprises an elongate member having an enlarged head at one end and at least one transverse opening spaced from the head, the opening configured to receive a retaining device.

D5. The assembly of paragraph D1, wherein the connection member comprises a U-bolt, and wherein each of the front connector elements of the second module is configured to be secured to a corresponding adjacent rear connector element of the first module by passing a first leg of the U-bolt through the aperture of the front connector element and a second leg of the U-bolt through the aperture of the rear connector element.

D6. The assembly of paragraph D0, wherein a lower end of each of the riser supports lies in the first plane.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A photovoltaic module comprising:
   a first frame portion including first and second opposing side members defining a first plane, each of the first and second side members having a leading end portion and a trailing end portion, and a cross member connecting the first and second side members, the first frame portion configured to support ballast;
   a second frame portion including third and fourth opposing side members extending respectively from the trailing end portions of the first and second side members, upper faces of the third and fourth opposing side members defining a second plane oriented at a predetermined angle relative to the first plane, each of the third and fourth side members having a leading end portion adjacent the first frame portion and a trading end portion opposite the leading end portion;
   a photovoltaic panel supported by upper faces of the third and fourth side members and lying substantially parallel to the second plane; and
   a pair of opposing riser supports connected respectively to the trailing end portions of the third and fourth side members, the pair of riser supports configured to support the third and fourth side members at the predetermined angle;
   wherein the photovoltaic module is configured to be stackable atop a substantially identical module in a storage configuration in which the first frame portions of the modules are adjacent and parallel to each other, the second frame portions of the modules are adjacent and parallel to each other, and each riser support of the lower module nests at least partially inside a corresponding riser support of the upper module.

2. The module of claim 1, wherein the cross member is a first cross member, the module further comprising a second cross member connecting the trailing end portions of the first and second side members, the second cross member having arm upper face lying in the second plane.

3. The module of claim 2, wherein the photovoltaic panel is further supported by the second cross member.

4. The module of claim 2, further including a plurality of intermediate members each transversely connecting the first and second cross members.

5. The module of claim 1, wherein the first frame portion further includes a tray for holding ballast.

6. The module of claim 1, further comprising a wind deflector spanning the pair of riser supports, the wind deflector including a support surface lying in the second plane, the photovoltaic panel being further supported by the support surface of the wind deflector.

7. The module of claim 1, further comprising a wind deflector spanning the pair of riser supports, the wind deflector including a deflector surface oriented transverse to the first and second planes, and a raceway running between the pair of riser supports and configured to retain intermodule wiring.

8. The module of claim 1, wherein one riser support of the pair of riser supports includes a single aperture configured to pass one or more electrical cables therethrough.

9. The module of claim 1, wherein the first, second, third, and fourth side members are constructed from a wood plastic composite material.

10. The module of claim 1, wherein the leading end portion of the first side member includes a first connector element having an aperture oriented parallel to the first plane and perpendicular to a long axis of the first side member.

11. The module of claim 10, wherein one riser support of the pair of riser supports includes a second connector element having an aperture oriented parallel to the aperture of the first connector element.

12. The module of claim 11, wherein the second connector element is configured to matingly engage with the first connector element of an adjacent, substantially similar module.

13. The module of claim 12, wherein the first connector element is a male connector element and the second connector element is a female connector element.

14. The module of claim 1, each riser support of the pair of riser supports including a side wing, wherein a corresponding side wing of the substantially identical module is configured be received between the side wing and the riser support of the module, in a stacked configuration of the module atop the substantially identical module, so as to restrict relative lateral motion between the module and the substantially identical module.

15. The module of claim 1, each riser support of the pair of riser supports including a mechanical stop configured to maintain spacing of adjacent stacked modules.

16. The module of claim 1, wherein the first and third side members comprise a unitary member having an angle formed therein.

17. The module of claim 1, further including a third cross member connecting trailing end portions of the third and fourth side members.

18. A photovoltaic module comprising:
a first frame portion including first and second opposing side members defining a first plane parallel to a support surface for the photovoltaic module, each of the first and second side members having a leading end portion and a trailing end portion, and a cross member connecting the first and second side members in the first plane, the first frame portion configured to support ballast;
a second frame portion including third and fourth opposing side members extending respectively from the trailing end portions of the first and second side members in a direction extending away from the leading end portions of the first and second side members, upper faces of the third and fourth opposing side members defining a second plane oriented at a predetermined angle relative to the first plane, each of the third and fourth side members having a leading end portion adjacent the first frame portion and a trailing end portion opposite the leading end portion, a second cross member extending between the third and fourth side members at the leading end portions;
a pair of opposing riser supports connected respectively to the trailing end portions of the third and fourth side members, the pair of riser supports configured to support the third and fourth side members at the predetermined angle;
a wind deflector spanning the pair of riser supports, the wind deflector having a support surface lying in the second plane and a deflector surface intersecting the second plane; and
a photovoltaic panel lying substantially parallel to the second plane, the panel being supported on a first side by the upper face of the third side member, on a second side by the upper face of the fourth side member, and on a third side by the support surface of the wind deflector.

19. The module of claim 18, wherein the cross member is a first cross member, the module further comprising a second cross member connecting the trailing end portions of the first and second side members, the second cross member having an upper face lying in the second plane, the photovoltaic panel being supported on a fourth side by the upper face of the second cross member.

20. The module of claim 19, further including a plurality of intermediate members each transversely connecting the first and second cross members.

21. The module of claim 18, wherein the first frame portion further includes a tray for holding ballast.

22. The module of claim 18, the wind deflector further including a raceway running between the pair of riser supports and configured to retain intermodule wiring.

23. The module of claim 18, wherein one riser support of the pair of riser supports includes a single aperture configured to pass one or more electrical cables therethrough.

24. The module of claim 18, wherein the first, second, third, and fourth side members are constructed from a wood plastic composite material.

25. The module of claim 18, wherein the leading end portion of the first side member includes a first connector element having an aperture oriented parallel to the first plane and perpendicular to a long axis of the first side member.

26. The module of claim 25, wherein one riser support of the pair of riser supports includes a second connector element having an aperture oriented parallel to the aperture of the first connector element.

27. The module of claim 26, wherein the second connector element is configured to matingly engage with the first connector element of an adjacent, substantially similar module.

28. The module of claim 27, wherein the first connector element is a male connector element and the second connector element is a female connector element.

29. A photovoltaic assembly comprising at least first and second substantially similar photovoltaic modules, each module including:
a first frame portion including first and second opposing side members defining a first plane parallel to a support surface for the photovoltaic module, each of the first and second side members having a leading end portion including a front connector element and a trailing end portion, and a cross member connecting the first and second side members in the first plane, the first frame portion configured to support ballast;
a second frame portion including third and fourth opposing side members extending respectively from the trailing end portions of the first and second side members in a direction extending away from the leading end portions of the first and second side members, upper faces of the third and fourth opposing side members defining a second plane oriented at a predetermined angle relative to the first plane, each of the third and fourth side members having a leading end portion adjacent the first frame portion and a trailing end portion opposite the leading end portion;
a photovoltaic panel supported by upper faces of the third and fourth side members and lying substantially parallel to the second plane; and
a pair of opposing riser supports connected respectively to the trailing end portions of the third and fourth side members, the pair of riser supports configured to support the third and fourth side members at the predetermined angle, each of the pair of opposing riser supports including a rear connector element;
wherein, when the first module is installed on the support surface, which is substantially planar, the third and fourth side members are supported only at the respective leading and trailing end portions; and wherein the second module is disposed longitudinally adjacent to and laterally aligned with the first module, and each of the front connector elements of the second module is configured to be secured to a corresponding adjacent one of the rear connector elements of the first module by inserting a connection member.

30. The assembly of claim 29, wherein each of the front and rear connector elements includes a transverse aperture.

31. The assembly of claim 30, wherein each of the front connector elements of the second module is configured to matingly engage with a corresponding one of the rear connector elements of the first module to form mated male and female connector element pairs having coaxially aligned apertures.

32. The assembly of claim 31, wherein each mated connector element pair is configured to be secured by passing the connection member through the aligned apertures of the front and rear connector elements.

33. The assembly of claim 32, wherein the connection member comprises an elongate member having an enlarged head at one end and at least one transverse opening spaced from the head, the opening configured to receive a retaining device.

34. The assembly of claim 29, wherein the connection member comprises a U-bolt, and wherein each of the front connector elements of the second module is configured to be secured to a corresponding adjacent rear connector element of the first module by passing a first leg of the U-bolt through the aperture of the front connector element and a second leg of the U-bolt through the aperture of the rear connector element.

* * * * *